(12) United States Patent
Hisada et al.

(10) Patent No.: US 7,023,150 B2
(45) Date of Patent: Apr. 4, 2006

(54) DRIVE DEVICE

(75) Inventors: Hideki Hisada, Anjo (JP); Kazuo Aoki, Anjo (JP); Hiroyuki Kojima, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 158 days.

(21) Appl. No.: 10/069,395

(22) PCT Filed: Jul. 11, 2001

(86) PCT No.: PCT/JP01/06021

§ 371 (c)(1),
(2), (4) Date: Apr. 3, 2002

(87) PCT Pub. No.: WO02/04806

PCT Pub. Date: Jan. 17, 2002

(65) Prior Publication Data

US 2002/0171383 A1    Nov. 21, 2002

(30) Foreign Application Priority Data

Jul. 11, 2000    (JP) .............................. 2000-209587

(51) Int. Cl.
  *H02P 1/54* (2006.01)
  *H02P 5/46* (2006.01)
  *H02P 7/68* (2006.01)
(52) U.S. Cl. .................. 318/34; 318/139; 318/432; 318/434; 318/700; 318/731; 290/17; 290/45; 180/65.1; 180/65.2
(58) Field of Classification Search .............. 318/139, 318/432–434, 700, 731, 800, 34; 290/45, 290/17; 180/65.1, 65.2; 701/1–22; 323/201–204
See application file for complete search history.

(56) References Cited

U.S. PATENT DOCUMENTS

| | | | | |
|---|---|---|---|---|
| 5,053,632 A * | 10/1991 | Suzuki et al. | ................. | 290/45 |
| 5,117,931 A * | 6/1992 | Nishida | ..................... | 180/65.2 |
| 5,469,816 A * | 11/1995 | Murakawa et al. | ............ | 123/2 |
| 5,703,410 A * | 12/1997 | Maekawa | ..................... | 290/40 |
| 5,789,881 A * | 8/1998 | Egami et al. | ............... | 318/139 |
| 5,856,709 A * | 1/1999 | Ibaraki et al. | ............... | 290/45 |
| 5,934,395 A * | 8/1999 | Koide et al. | ............... | 180/65.2 |
| 6,018,198 A * | 1/2000 | Tsuzuki et al. | ............... | 290/17 |
| 6,233,508 B1 * | 5/2001 | Deguchi et al. | ............. | 701/22 |
| 6,253,127 B1 * | 6/2001 | Itoyama et al. | ............... | 701/22 |
| 6,396,165 B1 * | 5/2002 | Nagano et al. | ............ | 307/10.6 |

(Continued)

FOREIGN PATENT DOCUMENTS

JP      2-286874 A     11/1990

(Continued)

*Primary Examiner*—David Martin
*Assistant Examiner*—Tyrone Smith
(74) *Attorney, Agent, or Firm*—Oliff & Berridge, PLC

(57) ABSTRACT

A hybrid drive apparatus includes an engine, a first electric motor for generating electric power by using at least a portion of its output and for controlling the speed of the engine and a control unit for controlling the engine and the first electric motor. The control unit performs a prepositioning control for positioning the engine being fuel-cut to a predetermined cranking start position such as a constant crank angle position or a constant cranking load position by the motoring of the first electric motor. As a result, the engine can always be started under identical conditions, and the torque vibrations to be outputted to a wheel have identical waveforms so that a simple torque correction can be made by outputting corresponding waveform data.

28 Claims, 34 Drawing Sheets

U.S. PATENT DOCUMENTS 6,546,319 B1 * 4/2003 Yamaguchi et al. .......... 701/22

FOREIGN PATENT DOCUMENTS

| JP | 8-295140 A | 11/1996 |
| JP | 9-170533 A | 6/1997 |
| JP | 9-264235 A | 10/1997 |
| JP | 10-82332 | 3/1998 |
| JP | 11-82261 A | 3/1999 |
| WO | WO 99/15787 A1 | 4/1999 |
| WO | WO 99/54621 A1 | 10/1999 |

* cited by examiner

DRIVE DEVICE

BACKGROUND OF THE INVENTION

1. Field of Invention

The invention relates to a drive apparatus having an engine and an electric motor and, more particularly, to an engine start control for the apparatus.

2. Description of Related Art

In a hybrid drive apparatus using an engine (or a combustion engine) and an electric motor together as its power source, when the engine fuel-cut is restarted while the vehicle is running, the cranking load of the engine affects the motor torque to be outputted to a wheel. Thus, a relatively high cranking shock is caused by the fluctuation in the drive torque. As a technique of the related art for reducing this cranking shock, therefore, there is a technique disclosed in Japanese Patent Laid-Open No. 82332/1998. In this related art technique, there is adopted a method for reducing the cranking torque of the engine. When the engine is motored and started by a motor coupled mechanically to the crank-shaft through a damper, the opening/closing timings of an intake valve of the engine are delayed to reduce the effective compression ratio of the engine so that the engine may be rotationally driven smoothly to reduce the amplitude of the torsional vibration of the crank-shaft and to quickly pass the rotational range in which the resonant phenomenon occurs.

Here, the crank angle at the engine stop time does not fall at an identical position but always disperses. Depending upon this difference in the engine stop position, the rise in the engine speed may be delayed at the initial stage of the engine start and may fail to quickly pass the rotational range of the resonance phenomenon. Even if the cranking torque is effectively reduced, moreover, the torque fluctuation to be transmitted to the wheel at the engine starting time is different due to the difference in the engine stop position so that the inexpensive feedforward control for correcting the torque fluctuation cannot be made on the basis of the simple correction waveform data. In order to absorb this torque fluctuation effectively, it is necessary to always add different torque corrections. This torque correction requires a complicated feedback control.

SUMMARY OF THE INVENTION

Therefore, the invention raises the engine speed quickly at the beginning of the engine starting time to quickly pass the rotational range of the resonance phenomenon. The invention also provides a drive apparatus which is enabled to correct the output torque fluctuation at the engine starting time by an inexpensively realizable feedforward control or a simple feedback control thereby to reduce the cranking shock.

To achieve the foregoing, there is provided a drive apparatus comprising an engine, a first electric motor that raises an engine to a speed for an ignition; and a control unit that controls the engine and the first electric motor, wherein the control unit makes a prepositioning control for controlling the first electric motor with a torque output so that the engine being stopped may be positioned at a predetermined crank-shaft position.

In the aforementioned construction, the engine being fuel-cut is positioned at the predetermined cranking start position by the torque output of the first electric motor so that the engine start can always be effected under identical conditions by the motoring of the first electric motor. As a result, the torque vibration to be outputted to the wheel has an identical waveform to make the correction of the drive torque possible for absorbing the torque vibration by the simple control such as the feedforward control to output the corresponding waveform data.

In the aforementioned construction, the control unit can cause the first electric motor to output a torque short of a torque necessary for running the engine continuously. The control unit can also cause the first electric motor to output an arbitrary constant torque. Alternatively, the control unit can also cause the constant torque to be outputted only for a predetermined time.

In the aforementioned construction, it is effective to adopt a construction which further comprises a first crank-shaft position detecting device for detecting the crank-shaft position, and in which the control unit makes the predetermined time variable according to the difference between a present crank-shaft position and the predetermined crank-shaft position. It is also effective to adopt a construction which further comprises a second crank-shaft position detecting device for detecting the predetermined crank-shaft position, and in which the control unit causes the first electric motor to output a torque until the crank-shaft is positioned at the predetermined crank-shaft position. The control unit can also cause the first electric motor to output a variable torque.

In the aforementioned construction, it is possible to adopt a construction which further comprises a first crank-shaft position detecting device for detecting the crank-shaft position, and in which the control unit can cause the variable torque to be outputted according to the difference between a present crank-shaft position and the predetermined crank-shaft position.

In the aforementioned construction, the control unit can have a variable torque map predetermined according to the difference between the present crank-shaft position and the predetermined crank-shaft position. It is also effective that the variable torque is a torque along the cranking torque of the engine. Moreover, it is also effective that the predetermined crank-shaft position is the position at which the cranking torque of the engine is the highest.

In this construction, at the time of the engine start after the crank-shaft position control, the cranking speed can be promptly raised from the initial time of the motoring thereby to pass the rotational range of the resonance phenomenon quickly.

In the aforementioned construction, moreover, it is effective to adopt a construction which further comprises a second electric motor, in which the engine, the first electric motor and the second electric motor are mechanically connected to a wheel, and in which the control unit controls the second electric motor so as to absorb the fluctuation in the torque to be outputted to the wheel during said prepositioning control. In this construction, the driving force fluctuation in the crank-shaft position control can be corrected by the second electric motor thereby to prevent the physical feeling of the driver from being deteriorated by the crank-shaft position control. The control unit can also calculate the fluctuation of the torque to be outputted to the wheel, from the torque outputted by the first electric motor. Alternatively, the control unit can also control the second electric motor on the basis of a first torque correction map predetermined according to the prepositioning control. Moreover, the control unit can also cause the first electric motor and the second electric motor to output torques simultaneously.

Next, in the aforementioned construction, the control unit can execute the prepositioning control prior to the motoring. In this construction, the crank-shaft position control is made prior to the start of the engine so that the cranking start position at the engine start can be constant. The control unit can also control the speed of the first electric motor at the time when the engine is raised to the speed for the ignition. Alternatively, the control unit can also control the torque of the first electric motor at the time when the engine is raised to the speed for the ignition. In this case, the control unit can control the torque of the first electric motor on the basis of a predetermined map.

In any of the aforementioned constructions, it is effective to make a construction in which the control unit controls the second electric motor so as to absorb the torque fluctuation to be outputted to the wheel at the time when the engine is raised to the speed for the ignition. In this construction, the driving force fluctuation during the engine start can be corrected by the second electric motor so that the torque oscillation by the cranking at the engine starting time can be offset to prevent the deterioration of the physical feeling of the driver. In this case, it is possible to adopt a construction in which the control unit calculates the fluctuation of the torque to be outputted to the wheel, from the torque outputted by the first electric motor. In the aforementioned construction, the control unit can control the second electric motor on the basis of a second correction map predetermined according to the time when the speed is raised to the speed of the ignition. In this construction, the fluctuation in the motive power to be outputted to the wheel is always constant so that the cranking shock at the engine starting time can be reduced at a low cost by mapping the torque to be corrected in the second electric motor, without requiring the processor capable of calculating the fluctuation of the motive power at a high speed.

In the aforementioned construction, it is also possible to adopt a construction in which the control unit further controls the second electric motor on the basis of a third torque correction map predetermined according to the crank-shaft position of the engine. In the aforementioned construction, the control unit can cause the first electric motor and the second electric motor to output torques simultaneously.

In any of the constructions for the crank-shaft position control, it is effective that said control unit makes said prepositioning control if the drive demand of the driver is no more than a predetermined value. In this construction, when the drive demand is not less than the predetermined value, the time for rotating the engine to the cranking position before the start can be shortened by taking the engine start preferentially, so that the engine can be quickly started.

In any of the aforementioned constructions, on the other hand, it is effective to adopt a construction in which the control unit executes said prepositioning control subsequent to the engine running stop which is caused by lowering the engine run forcibly by a generator after a fuel cut. In this construction, the crank-shaft position control is made subsequent to the engine stop, so that necessary torque fluctuation at that time can be continuously followed by the torque fluctuation at the engine position control thereby to eliminate the physical disorder of the crank-shaft position control, as might otherwise be given to the driver. In this case, it is effective to adopt a construction in which the control unit controls the second electric motor so as to absorb the fluctuation of the torque to be outputted to the wheel while the engine run is being forcibly lowered.

In any of the aforementioned constructions, it is also effective that the construction further comprises a one-way clutch for blocking the reverse run of the engine. In this construction, the engine can be held at a position, when it is turn to a predetermined rotational load position, by the one-way clutch. Even in case the drive demand of the driver changes just after the engine stop, the crank-shaft position control can be made at an arbitrary timing. Moreover, the torque need not be continuously applied by the first electric motor so as to hold the engine at the cranking position, so that the excessive power consumption can be prevented.

Next, according to the invention, there is provided a drive apparatus comprising a first electric motor that raises an engine to a speed for an ignition and a control unit for controlling the engine and the first electric motor, wherein in the control unit controls the first electric motor with a torque output so that the cranking torque during the motoring may be a predetermined torque.

In this construction, at the engine starting time, the cranking is done with a constant torque output of the first electric motor so that the torque vibration to be then outputted to the wheel can have identical waveforms, to correct the drive torque for absorbing the torque vibration by the simple control such as the feedforward control to output the corresponding waveform data.

BRIEF DESCRIPTION OF THE DRAWINGS

Preferred embodiments of the invention will be described hereinafter in detail with reference to the drawings.

DETAILED DESCRIPTION OF PREFERRED EMBODIMENTS

Embodiments of the invention will be described with reference to the drawings.

(Gear Train)

Figure 1:
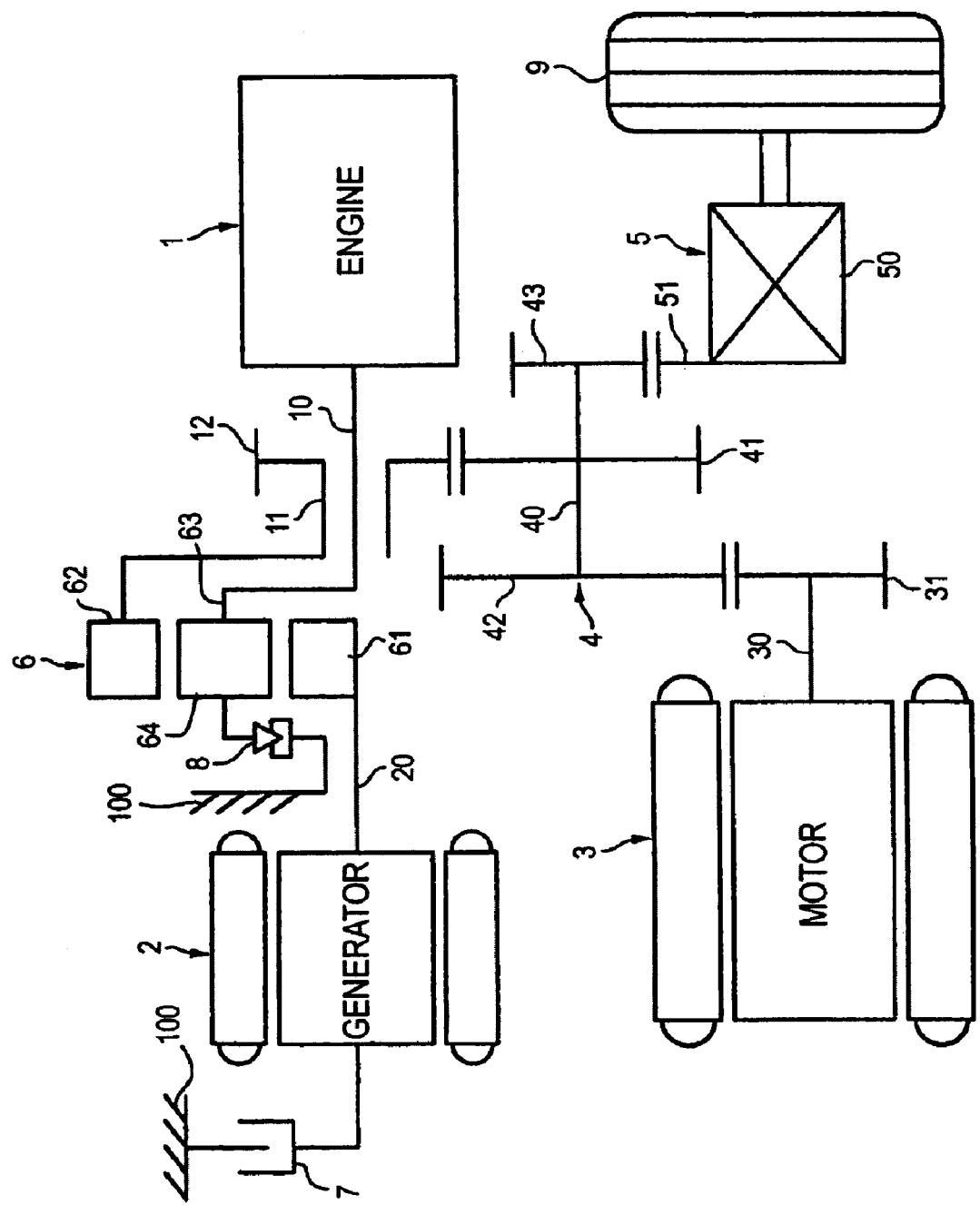
FIG. 1 is a skeleton diagram of a gear train of a hybrid drive apparatus according to an application of the invention.

FIG. 1 shows one example of a gear train construction of a hybrid drive apparatus, to which the invention is applied, in a skeleton diagram. The apparatus comprises the following components: an engine 1, a first electric motor (as will be called the "generator") 2 for generating an electric power by using at least a portion of the output of the engine 1 and for raising the engine 1 to a speed for an ignition, a three-element planetary gear set (as will be called the "planetary") 6, a generator brake 7 for stopping the rotation of the generator 2, a one-way clutch 8 for preventing the reverse rotation of the engine 1, and a second electric motor (as will be called the "drive motor") 3 controlled to set the power to be outputted to a wheel 9 to a desired value by using the generated electric power or stored electric power of the generator 2.

This gear train will be described in more detail. The drive apparatus is of a four-axis construction of axes parallel to one another, of which: an engine axis carries the engine 1, the generator 2 and the planetary 6; the motor axis carries the drive motor 3; the counter axis carries a counter gear mechanism 4; and the diff axis carries a differential unit 5. Moreover, the engine 1 and the generator 2 are drivingly connected to each other through the planetary 6 and to the counter gear mechanism 4 through the planetary 6, and the drive motor 3 and the differential unit 5 are drivingly connected directly to the counter gear mechanism 4.

The planetary 6 is given a simple planetary construction including: a sun gear 61; a carrier 63 for supporting a pinion 64 circumscribed to rotatably mesh with the sun gear 61; and a ring gear 62 inscribed to mesh with the pinion 64.

The engine 1 is drivingly connected to the generator 2 and the counter gear mechanism 4 by connecting an engine output shaft 10, as connected to its crank-shaft through a fly wheel damper, to the carrier 63 of the planetary 6. The generator 2 is drivingly connected to the engine 1 and the counter gear mechanism 4 by connecting its rotor shaft 20 to the sun gear 61 of the planetary 6. Moreover, the ring gear 62 of the planetary 6 is connected through an output shaft 11 on the engine axis to a first counter drive gear 12 integrated with or fixed on the output shaft 11. On the other hand, the carrier 63 of the planetary 6 is connected to a drive unit case 100 through the one-way clutch 8 which is locked by the reverse rotation of the engine output shaft 10. Moreover, the rotor shaft 20 of the generator 2 is connected through the generator brake 7 to the drive unit case 100.

The drive motor 3 is drivingly connected to the counter gear mechanism 4 through a counter drive gear 31 which is integrated with or fixed on a rotor shaft 30 or the motor shaft connected with the former.

The counter gear mechanism 4 is constructed to include: a counter shaft 40; two counter driven gears 41 and 42 integrated with or fixed on the former; and a diff drive pinion gear 43. The counter gear mechanism 4 is drivingly connected to the output shaft 11 on the engine axis and the motor shaft 30 by causing its counter driven gear 41 to mesh with the counter drive gear 12 on the side of the output shaft 11 on the engine axis and by causing the counter driven gear 42 to mesh with the counter drive gear 31 on the side of the motor shaft 30.

The differential unit 5 is drivingly connected to the counter gear mechanism 4 by causing a diff ring gear 51 fixed on its diff case 50 to mesh with the diff drive pinion gear 43 of the counter shaft 40. Moreover, the differential unit 5 is drivingly connected to the wheel 9, as well known in the art.

Figure 2:
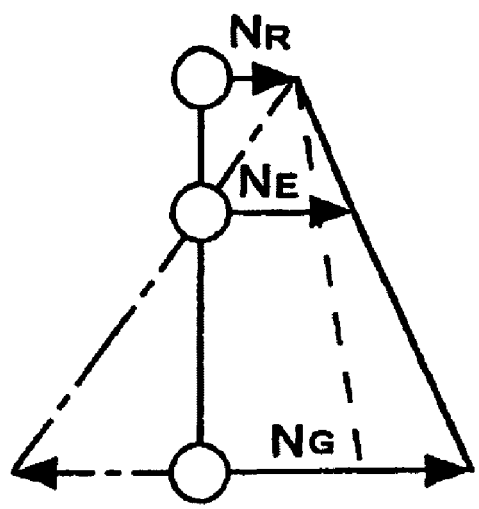
FIG. 2 is a velocity diagram of a planetary gear set of the hybrid drive apparatus.
Figure 3:
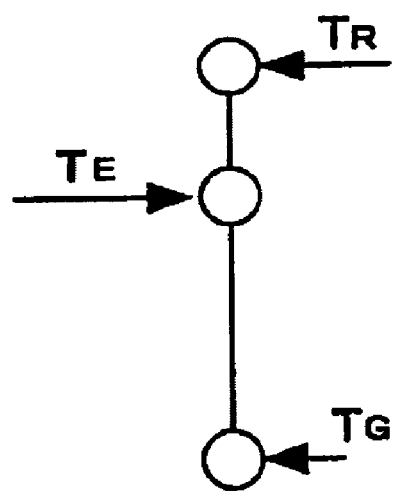
FIG. 3 is a torque diagram of the planetary gear set of the hybrid drive apparatus.

In the hybrid drive apparatus thus constructed, the connected relations among the engine 1, the generator 2 and the output shaft 11 on the engine axis through the planetary 6 bring about the relations in speeds, as shown in FIG. 2, and the relations in torques, as shown in FIG. 3, among those three components. In the relations in the speeds shown in FIG. 2, specifically, the following relation holds among an engine speed ($N_E$), a generator speed ($N_G$), a ring gear speed ($N_R$) of the planetary and a ring-gear/sun-gear tooth number ratio ($\lambda$):

$$(\lambda+1)N_E = N_G + \lambda N_R$$

or the engine speed ($N_E$):

$$N_E = (N_G + \lambda N_R)/(\lambda+1) \qquad (1)$$

By increasing the generator speed ($N_G$) with the ring gear speed ($N_R$) corresponding to the vehicle speed being constant, therefore, the engine speed ($N_E$) rises (namely, the relation shifts from that indicated by a broken line to that indicated by a solid line). By setting the engine speed ($N_E$) to 0, the generator speed ($N_G$) is reversed by the $\lambda$ times of the ring gear speed ($N_R$) (namely, the relation shifts from that indicated by the broken line to that indicated by a single-dotted line).

In the relation in the torques shown in FIG. 3, on the other hand, the following relation holds among an engine torque ($T_E$), a generator torque ($T_G$) and a ring gear torque ($T_R$):

$$T_E : T_R : T_G = (\lambda+1) : -\lambda : -1 \qquad (2)$$

With the ring gear torque ($T_R$) being constant, therefore, the increase in the generator torque ($T_G$) acts as a driving torque on the engine 1, but the increase in the engine torque ($T_E$) acts as a driving torque on the generator 2.

In this drive apparatus, the engine 1 is mainly employed for exhibiting the driving force for the vehicle; the drive motor 3 for assisting the driving force; the engine 1 for driving the generator; the generator 2 for the power generation; and the drive motor 3 for the regenerative braking. Moreover, the generator 2 is employed, too, for starting or stopping the engine. By adjusting the generating load of the generator 2 in the outputting state of the engine with respect to the ring gear 62 of the planetary 6 for receiving the running load of the vehicle through the differential unit 5 and the counter gear mechanism 4, more specifically, the vehicle is enabled to run at a proper ratio utilizing the engine output for the driving force to the wheel 9 and for the generating energy (to charge the battery). When the generator 2 is caused to output the torque (for the power running) at the reverse rotation of the generator 2, moreover, the reaction applied to the carrier 63 of the planetary 6 is reversed so that the power of the generator 2 can be transmitted to the ring gear 62 by retaining the carrier 63 on the drive unit case 100 with the one-way clutch 8. Thus, the driving force at the vehicle starting time is intensified (for a run in a parallel mode) by the simultaneous outputs of the motor 3 and the generator 2.

In this gear train, moreover, at the engine starting time, the running load or the stopping load of the vehicle is applied from the wheel 9 to the ring gear 62 of the planetary 6 connected to the output shaft 11 on the engine axis and is used as a reaction to cause the reversely rotating generator 2 to output the torque (or to regenerate) thereby to drive the sun gear 61. As a result, the revolution of the pinion 64 around the sun gear 61 is outputted to the carrier 63 so that the engine 1 is motored. Even with the engine stopping while the vehicle is running, moreover, the driving force of the motor 3 or the reversely driving force from the wheel 9 acts on the ring gear 62 of the planetary 6 connected to the output shaft 11 on the engine axis, so that the generator is driven by the rotation of the sun gear 61 taking the reaction on the carrier 63 connected to the engine output shaft being stopped. By adjusting the engaging force of the brake 7 in this state, therefore, the carrier 63 as the reaction element in this state can be rotated to turn the engine 1.

(Control System)

Figure 4:
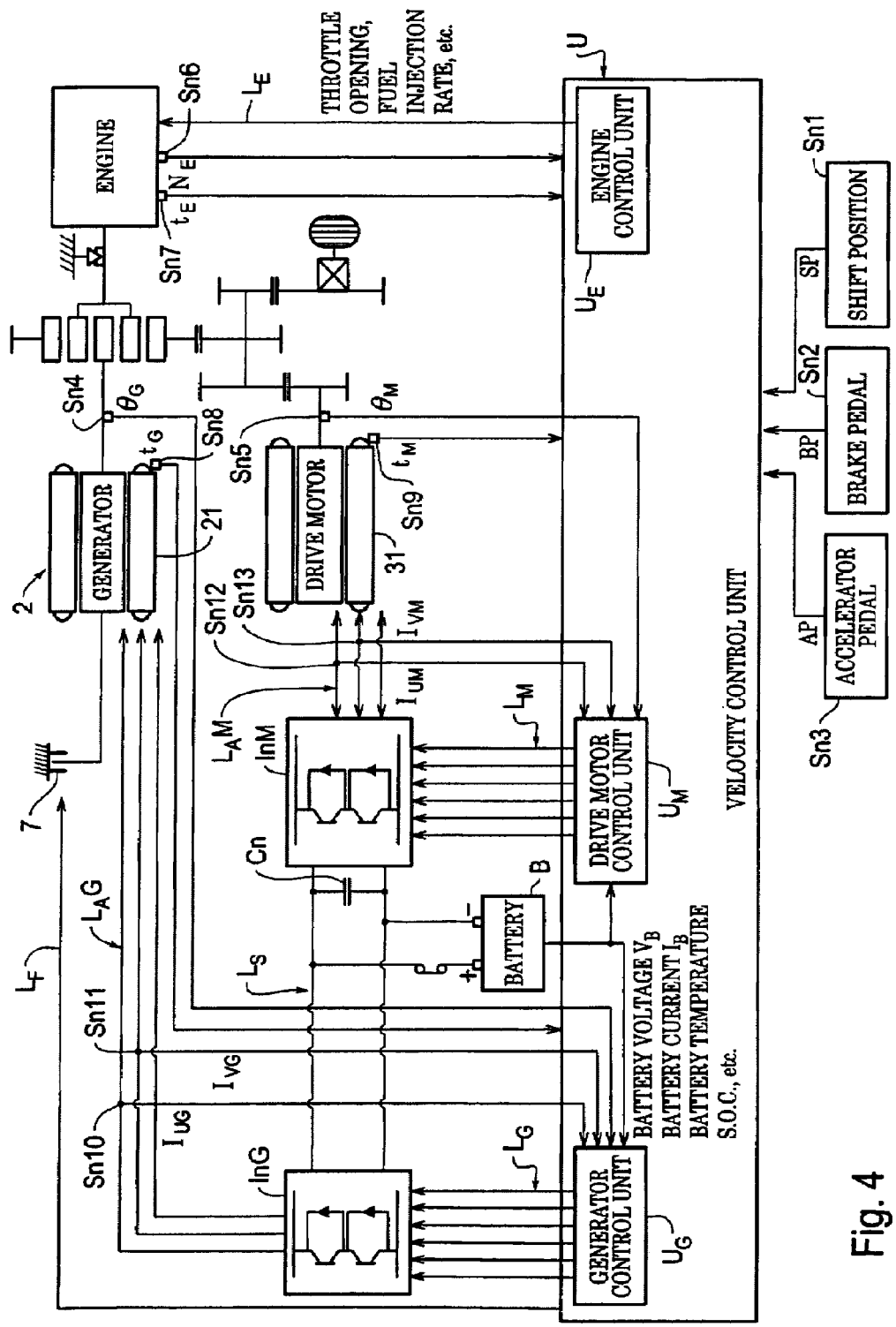
FIG. 4 is a system construction diagram of a control line of the hybrid drive apparatus.

FIG. 4 is a block diagram showing a system construction of a vehicle drive control system for controlling the gear train. This vehicle control system is constructed to include: a vehicle control unit U as a main component; a shift position sensor Sn1, a brake pedal sensor Sn2 and an accelerator pedal sensor Sn3 as input means for inputting demands of the driver to the vehicle control unit; various sensors (e.g., a generator rotor position sensor Sn4 or a drive motor rotor position sensor Sn5) as input means for inputting various pieces of information of the running situation of the vehicle; a battery B as a power source; a drive motor inverter InM as means for driving the drive motor 3; and a generator inverter InG for driving the generator 2.

The vehicle control unit U is a control unit composed of a CPU, a memory and so on for controlling the vehicle as a whole, and is provided with an engine control unit $U_E$, a generator control unit $U_G$ and a drive motor control unit $U_M$. The engine control unit $U_E$ is composed of a CPU, a memory and so on and is connected through a signal line $L_E$ with the engine 1 for sending a command signal such as a throttle opening θ or a fuel injection rate so as to control the engine 1. Moreover, the generator control unit $U_G$ is connected through a signal line $L_G$ with the inverter InG for sending a control signal to the inverter InG so as to control the generator 2 made of a three-phase AC electric motor (e.g., a permanent magnet type synchronous motor). Moreover, the drive motor control unit $U_M$ is connected through a signal line $L_M$ with the inverter InM for sending a control signal to the inverter InM so as to control the drive motor 3 made of a three-phase electric motor. The two inverters InG and InM are connected through a DC power line $L_S$ with the battery B and through three-phase (i.e., three phases U, V and W) AC power lines $L_AG$ and $L_AM$ with the three-phase coils of the individual stators 21 and 32 of the drive motor 3 and the generator 2. Here, reference letters Cn designate a smoothing capacitor for smoothing the DC voltage of the DC power line $L_S$ by suppressing its fluctuations.

More specifically, the inverter InG is so controlled on the basis of a PWM (Pulse Width Modulation) signal outputted by the generator control unit $U_G$ to the signal line $L_G$ as to convert the DC current fed from the battery B through the DC power line $L_S$, into electric currents $I_{UG}$, $I_{VG}$ and $I_{WG}$ of the individual U, V and W phases thereby to send the individual currents $I_{UG}$, $I_{VG}$, $I_{WG}$ through the three-phase AC power line $L_AG$ to the three-phase coils of the generator 2. At the power generating or regenerating time, on the other hand, the inverter InG is fed with the currents $I_{UG}$, $I_{VG}$ and $I_{WG}$ of the individual phases U, V and W, as generated in the three-phase coils of the generator 2, through the three-phase AC power line $L_AG$, and converts them into DC electric currents and sends the DC currents to the battery B through the DC power line $L_S$.

On the other hand, the inverter InM is so controlled on the basis of a control signal outputted by the drive motor control unit $U_M$ to the signal line $L_M$ as to convert the DC current fed from the battery B through the DC power line $L_S$, into electric currents $I_{UM}$, $I_{VM}$ and $I_{WM}$ of the individual U, V and W phases thereby to send the individual currents $I_{UM}$, $I_{VM}$, $I_{WM}$ through the three-phase AC power line LAM to the three-phase coils of the drive motor 3. At the power generating or regenerating time, on the other hand, the inverter InM is fed with the currents $I_{UM}$, $I_{VM}$ and $I_{WM}$ of the individual phases U, V and W, as generated in the three-phase coils of the drive motor 3, through the three-phase AC power line $L_AM$, and converts them into DC electric currents and sends the DC currents to the battery B through the DC power line $L_S$.

Of the various sensors, moreover, a battery sensor, as indicated only by a signal line $L_B$ although omitted, detects the states including the battery B, i.e., a battery voltage ($V_B$), a battery current ($I_B$), a battery temperature and a battery residue (SOC: State Of Charge), and inputs these pieces of information to the generator control unit $U_G$ and the drive motor control unit $U_M$. An engine speed sensor Sn6 detects the engine speed ($N_E$). The shift position sensor Sn1 detects a shift position (SP) of the not-shown speed selecting device. The accelerator pedal sensor Sn3 detects the position of the accelerator pedal, i.e., a depression (AP). The brake pedal sensor Sn2 detects the position of the brake pedal, i.e., a depression (BP). An engine temperature sensor Sn7 detects the temperature ($t_E$) of the engine 1. A generator temperature sensor Sn8 detects the temperature ($t_G$) of the generator 2 in terms of the temperature of the coil, for example. A drive motor temperature sensor Sn9 detects the temperature ($t_M$) of the drive motor 3 in terms of the temperature of the coil, for example. Moreover, the individual current sensors Sn10 to Sn12 of the three-phase AC power lines $L_AG$ and $L_AM$ are current sensors for detecting the current values $I_{UG}$, $I_{VG}$, $I_{UM}$ and $I_{VM}$ of the two in the three phases.

Thus, this vehicle control unit U performs the following processing operations to send an engine control signal to the engine control unit $U_E$ thereby to set the drive/stop of the engine 1, as will be detailed; to read the rotor position ($\theta_G$) of the generator 2 thereby to calculate the motor sped ($N_G$); to calculate the engine speed ($N_E$) by the aforementioned speed relation (1); to set the engine control unit $U_E$ with an engine target speed ($N_E^*$) indicating the target value of the engine speed ($N_E$); to set the generator control unit $U_G$ with a generator target speed ($N_G^*$) and a generator target torque ($T_G^*$); and to set the drive motor control unit $U_M$ with a drive motor target torque ($T_M^*$) and a drive motor torque correction value ($\delta T_M$).

In the present embodiment, the engine speed ($N_E$) is calculated by the vehicle control unit U but can also be read from the engine speed sensor Sn6. Moreover, a vehicle speed (V) is calculated on the basis of the rotor position ($\theta_M$) of the drive motor 3 but can also be calculated on the basis the ring gear speed ($N_R$) of the planetary 6 or the speed of the wheel 9. In this case, a ring gear speed sensor, a wheel speed sensor and so on are arranged as the vehicle speed detecting means.

On the other hand, the vehicle control unit U is further provided with an oil pressure circuit $L_F$ for controlling the oil pressure of the brake 7 of the gear train and for lubricating and cooling the individual portions of the mechanism, and a hydraulic control unit for controlling the former, but the details of those circuit and unit are omitted from the Drawings.

Next, the drive control of the drive apparatus by the vehicle control unit U will be described with reference to the following flow charts.

(Control Flow)

Figure 5:
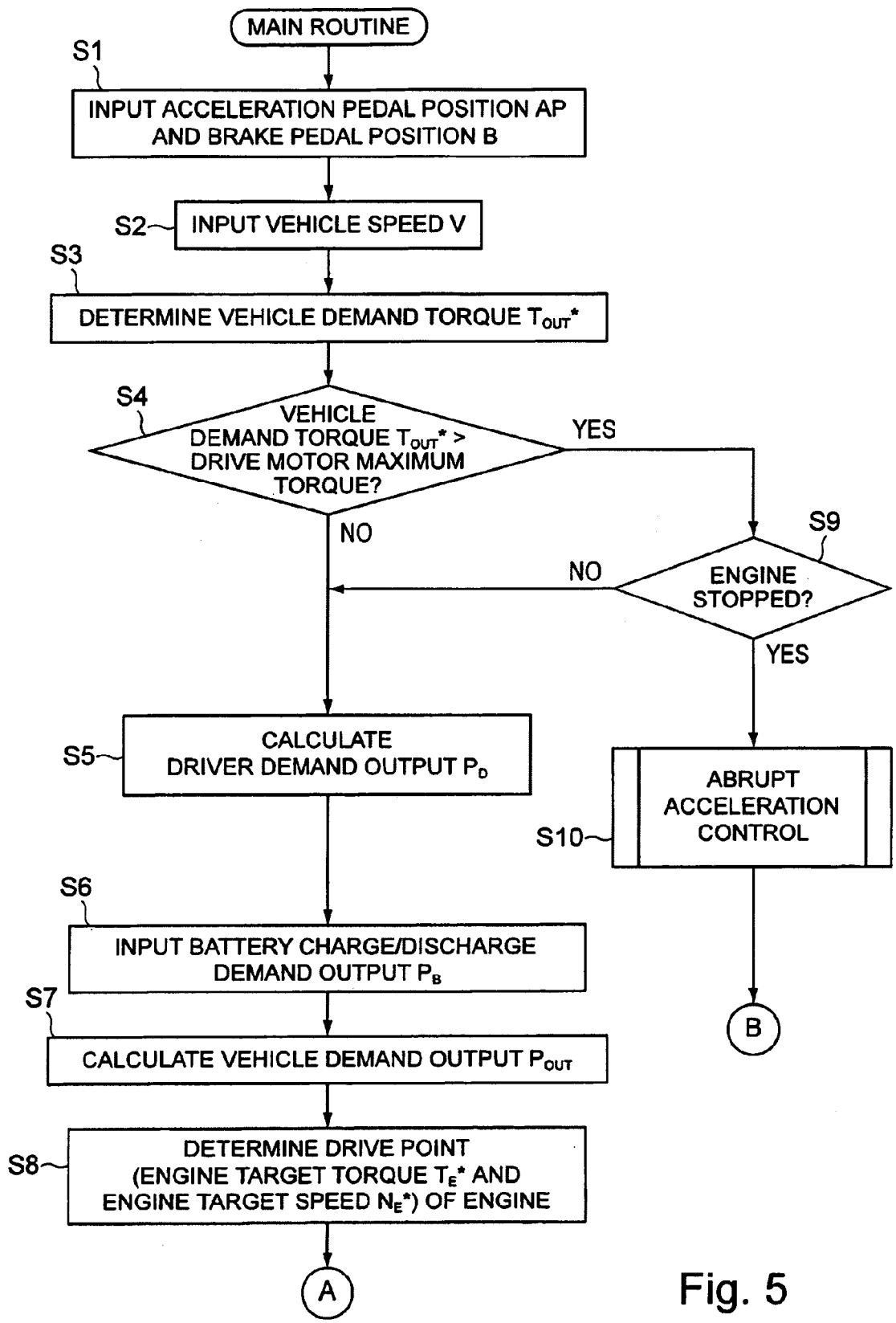
FIG. 5 is a flow chart of a first half of a main routine of a control unit.
Figure 6:
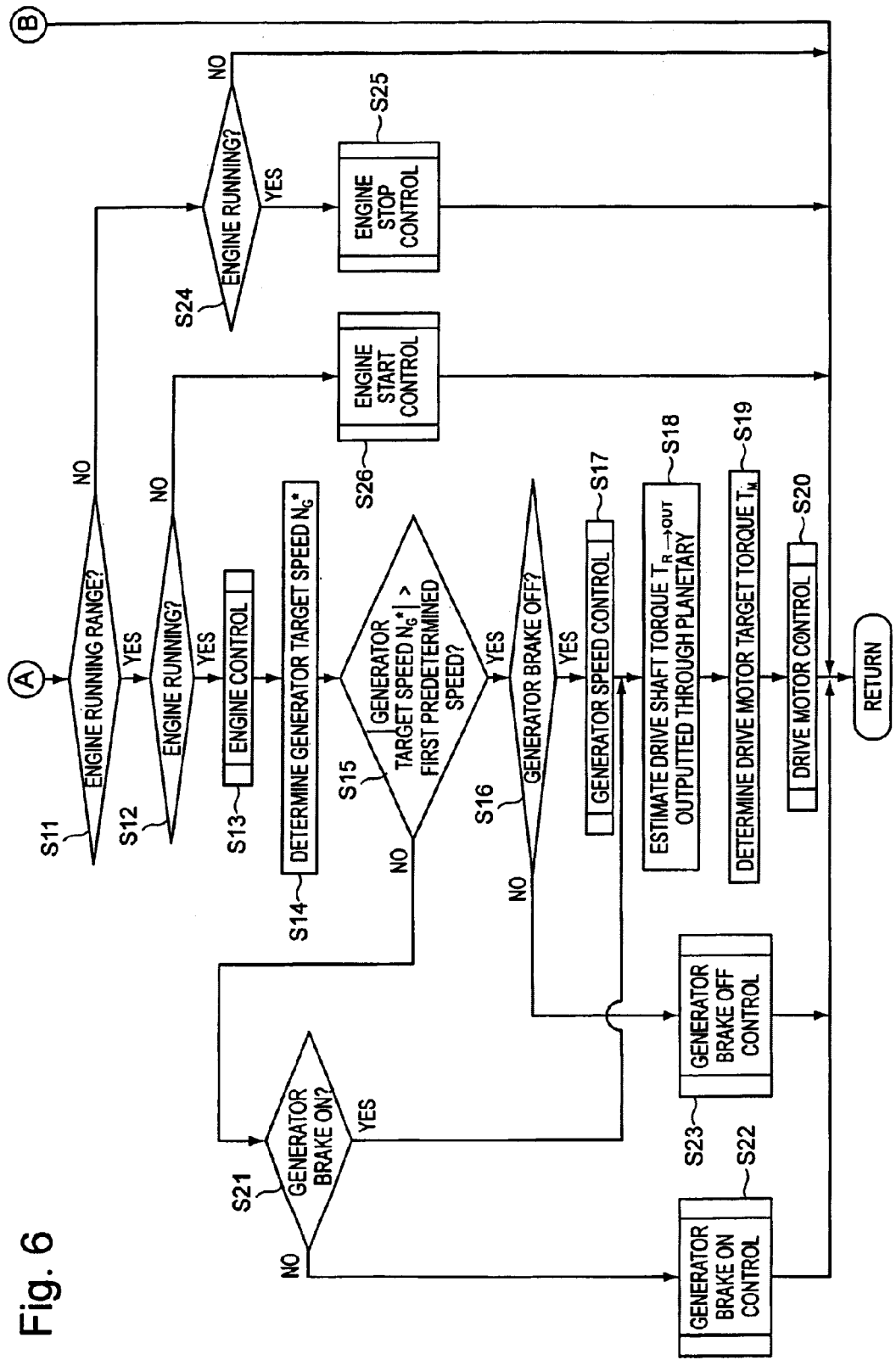
FIG. 6 is a flow chart of a second half of the main routine of the control unit.

FIG. 5 and FIG. 6 divide and show a main flow chart of the control by the vehicle control unit U. At initial Step S1, shown in FIG. 5, the accelerator pedal position (AP) is inputted from the accelerator pedal sensor Sn3, and the brake pedal position (BP) is inputted from the brake pedal sensor Sn2. At Step S2, the rotor position ($\theta_M$) is read from the rotor position sensor Sn5 of the drive motor 3 so that the vehicle speed (V) is calculated from the changing rate of the rotor position ($\theta_M$). Here, the vehicle speed (V) can also be calculated in another embodiment, as described hereinbefore, by providing a vehicle speed sensor separately to determine the vehicle speed.

Figure 7:
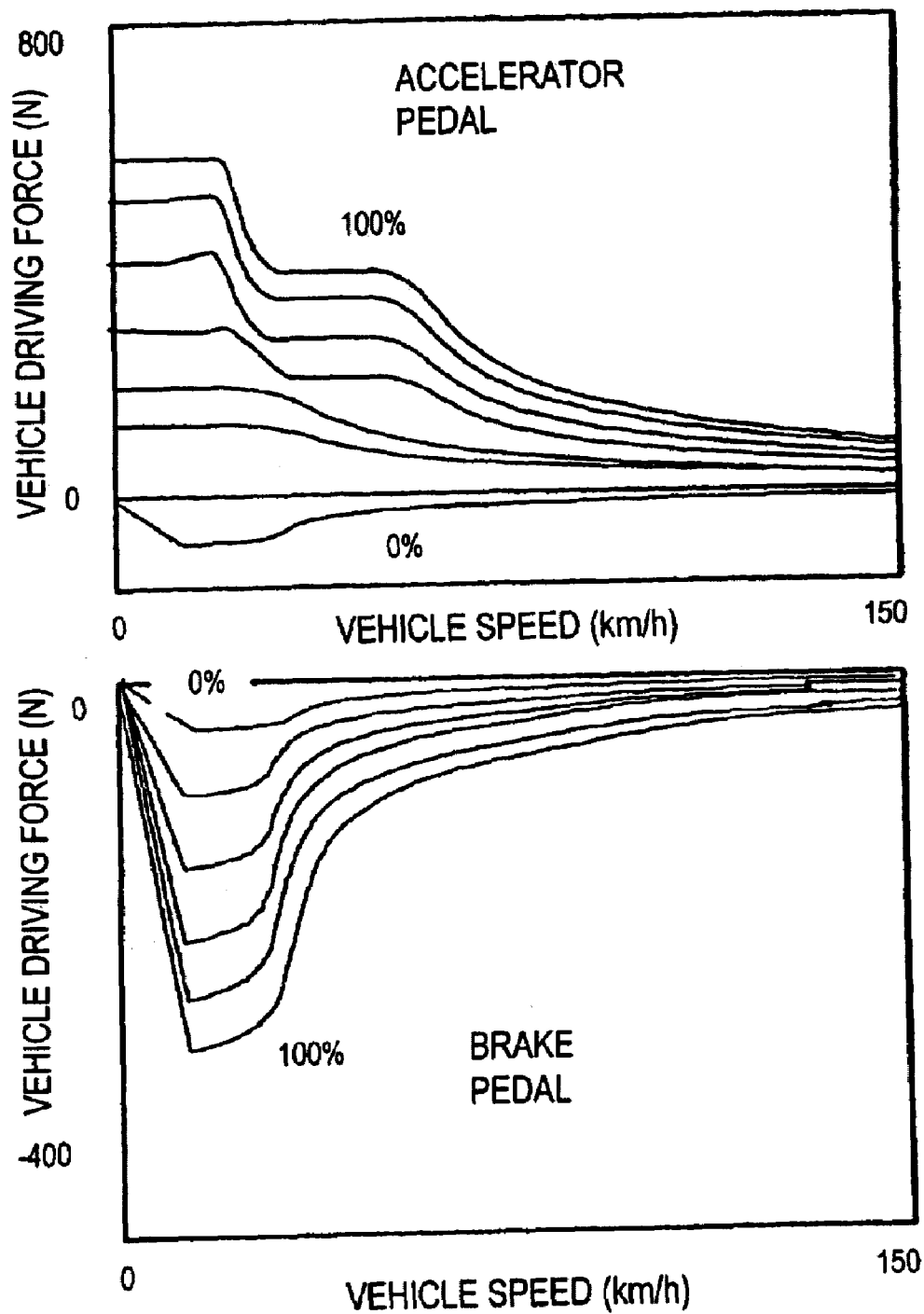
FIG. 7 is a vehicle demand torque map.

At Step S3, a vehicle demand torque ($T_{OUT}^*$) is determined. In this processing, the vehicle demand torque ($T_{OUT}^*$) is preset to correspond to the accelerator position. The brake pedal position and the vehicle speed is determined by referring to the vehicle demand torque map stored in the memory of the vehicle control unit U and as shown in the upper stage of FIG. 7, when the accelerator pedal is depressed so that the accelerator pedal position (AP) is inputted, and by referring the vehicle demand torque map stored likewise in the memory and shown in the lower stage of FIG. 7, when the brake pedal is depressed so that the brake pedal position (BP) is inputted.

At subsequent Step S4, it is decided whether the vehicle demand torque ($T_{OUT}^*$) set at the preceding Step is higher than the drive motor maximum torque which is rated in advance in the drive motor 3. If this decision holds (YES), the torque is short. Therefore, the routine advances to Step S9, at which it is decided whether the engine 1 is stopped. In the case of the engine stop at which the decision holds (YES), the driving force cannot be assisted by the engine 1 so that an abrupt acceleration control subroutine of Step S10 is executed. In this case, both the drive motor 3 and the generator 2 are driven to make them run in a parallel mode, as will be detailed.

Figure 8:
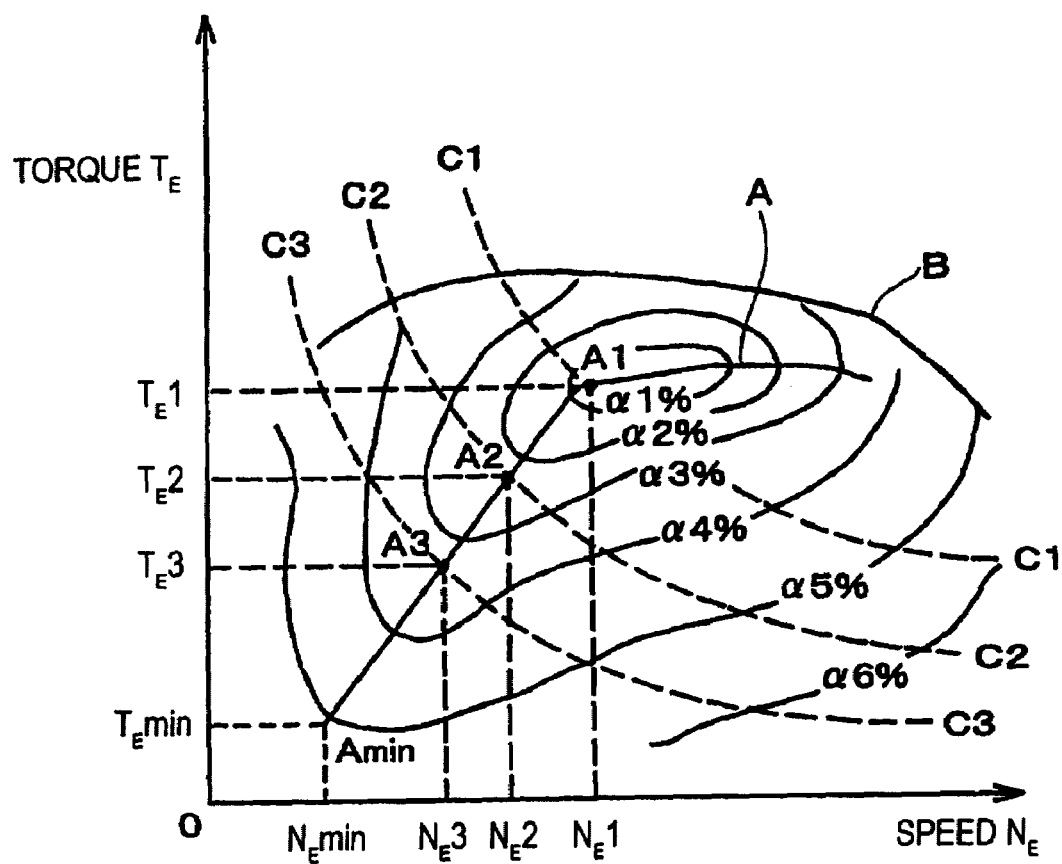
FIG. 8 is an engine target running state map.

If it is decided at Step S4 that the vehicle demand torque (TOUT*) is no more than the drive motor maximum torque, on the other hand, the routine advances to Step S5, at which driver demand output ($P_D$) is calculated. The driver demand output ($P_D$) is calculated as a product ($P_D = T_{OUT}^* V$) of the vehicle demand torque ($T_{OUT}^*$) and the vehicle speed (V). At Step S6, a battery charge/discharge demand output ($P_B$) is inputted. This output is calculated on the basis of a battery residue (SOC) read from the signal line $L_B$ of the battery sensor. At Step S7, moreover, a vehicle demand output ($P_{OUT}$) is calculated. This vehicle demand output ($P_{OUT}$) is calculated as a sum ($P_{OUT} = P_D + P_B$) of the driver demand output ($P_D$) and the battery charge/discharge demand output ($P_B$). At Step S8, the running point (i.e., an engine target torque $T_E^*$ and an engine target speed $N_E^*$) of the engine is determined. In this processing, with reference to the engine target running state map stored in the memory of the vehicle control unit U and shown in FIG. 8, the points (A1 to A3, $A_{min}$), at which broken curves C1 to C3 indicating the vehicle demand output (POUT) and the engine operating curve (i.e., a contour curve joining the running points for the highest efficiencies of the engine 1) at individual accelerator pedal positions ($\alpha 1\%$ to $\alpha 6\%$) intersect, are determined as the running points of the engine 1, the engine torques ($T_E 1$ to $T_E 3$, $T_E min$) at the running points are determined as the engine target torque ($T_E^*$) and the engine speeds ($N_E 1$ to $N_E 3$, $N_E min$) at those running points are determined as the engine target speed ($N_E^*$).

Figure 9:
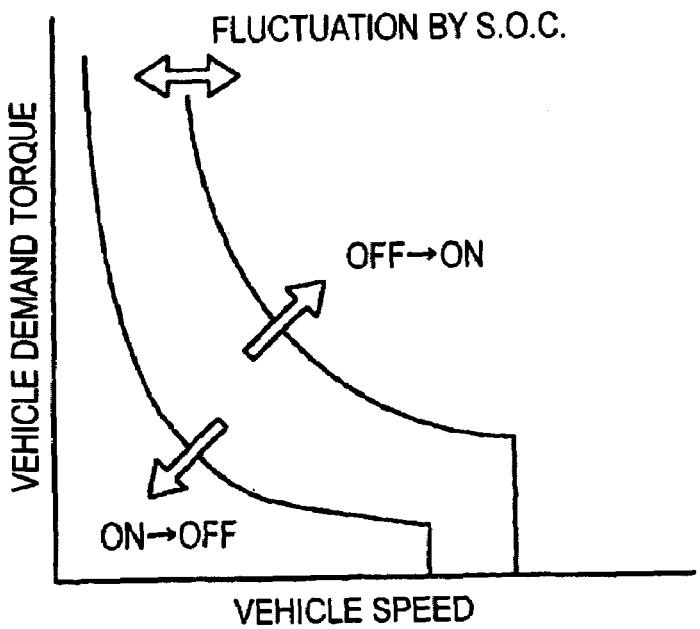
FIG. 9 is an engine running range map.

Referring to FIG. 6, a determination is made at Step S11 whether the engine is in the running range. This decision is made by judging, from the vehicle demand torque ($T_{OUT}^*$) and the vehicle speed (V) determined at preceding Steps with reference to the engine running range map stored in the memory of the vehicle control unit U and shown in FIG. 9, whether the engine 1 is in the running range. In FIG. 9 a curve crossing an arrow indicating OFF→ON is a boundary line on which the stopped engine is started, a curve crossing an arrow indicating ON→OFF is a boundary line on which the running range is stopped, the intermediate region is a hysteresis region for holding the stability of the control and the side on which the vehicle speed or vehicle demand torque is higher than that in the hysteresis region is the engine running range whereas the lower side is the engine stop range. Here, the curve crossing the arrow indicating OFF→ON for starting the engine is shifted the more rightward of the Drawing for the more battery residue (SOC) thereby to narrow the engine running range, and is shifted the more leftward for the less battery residue SOC thereby to widen the running range.

If the decision of Step S11 based on the map holds (YES), the routine advances to next Step S12, at which it is decided whether the engine is running. If this decision does not hold (NO), the engine 1 is not running although it is in the running range. At Step S26, therefore, there is executed the (later-described) engine start control subroutine. If the engine running range decision does not holds (NO) at the stage of Step S11, on the other hand, the routine transfers to Step S24, at which it is separately decided whether the engine is running. If this decision holds (YES), moreover, the engine is running although it is in the stop range. At next Step S25, therefore, there is executed the (later-described) engine stop control subroutine.

If the routine is returned to Step S12 at which the decision of the engine running holds (YES), the engine control subroutine is executed at Step S13. This processing is well known in the art so that the description and illustration of its specific contents are omitted.

At next Step S14, the generator target speed ($N_G^*$) is determined. This determination is made from the vehicle speed (V: determined from the changing rate of the rotor position $\theta_M$ of the drive motor 3 in the present embodiment) and the engine target speed ($N_E^*$) by using the foregoing speed relation (1) of the planetary.

At subsequent Step S15, it is decided whether the absolute value of the generator target speed ($N_G^*$) exceeds a first predetermined value (e.g., 500 rpm). This decision is made for the later selection of ON and OFF of the generator brake so as to reduce the energy loss. At a low generator speed ($N_G$) while the vehicle is run and driven by the engine, specifically, the power consumption increases to lower the power generation efficiency of the generator 2 and to deteriorate the fuel economy of the vehicle accordingly. When the absolute value of the generator speed ($N_G$) is smaller than a predetermined value, therefore, the generator brake 7 is applied to stop the generator 2 mechanically thereby to improve the fuel economy. If this decision holds (YES), moreover, the OFF state of the generator brake is confirmed at next Step S16. If this holds, the (later-described) generator speed control subroutine is executed at Step S17. Otherwise, the routine transfers to Step 23, at which there is executed the (later-described) generator brake OFF control subroutine. If the decision of preceding Step S15 does not hold, on the other hand, the ON state of the generator brake is confirmed at Step S21. If this confirmation does not hold, the generator brake ON control subroutine is executed at Step S22. If the confirmation holds, the routine returns to the steps after the generator speed control subroutine by Step S17.

Under the execution of the generator speed control subroutine at Step S17, the drive shaft torque ($T_R \to _{OUT}$) to be outputted through the planetary is estimated at next Step S18. This processing is executed by estimating a ring gear torque ($T_R$) from a generator torque ($T_G$) with the foregoing torque balance equation (2) of the planetary and by calculating the drive shaft torque ($T_R \to _{OUT}$) considering the counter gear ratio.

This processing will be described in more detail. The engine torque $T_E$, the ring gear torque $T_R$ and the generator torque $T_G$ receive reactions from one another, as described hereinbefore, so that the generator torque $T_G$ is converted into the ring gear torque $T_R$ and is outputted from the ring gear 62. When the generator rotating speed $N_G$ and the ring gear torque $T_R$ fluctuate as the ring gear torque $T_R$ is outputted from the ring gear 62, the ring gear torque $T_R$ having fluctuated is transmitted to the wheel 9 thereby to degrade the running feeling of the vehicle. Therefore, the ring gear torque $T_R$ is calculated while estimating the torque of the inertia of the generator 2 accompanying the fluctuations of the generator speed $N_G$. Therefore, the ring gear torque $T_R$ is calculated on the basis of the generator target torque $T_G^*$ and the aforementioned gear ratio $\lambda$, by calculating the ring gear torque by the operation of the vehicle control unit U and by reading the generator target torque $T_G^*$. Specifically, a sun gear torque $T_S$ to be applied to the sun gear 62 is expressed if the generator 2 has an inertia $I_G$ and if the generator 2 has an angular velocity (or rotation changing rate) $\alpha_G$, as follows:

$$T_S = T_G^* + I_G \alpha_G.$$

And, the ring gear torque $T_R$ is expressed because it is $\lambda$ times as large as the sun gear torque $T_S$ from the relation of the gear ratio, as follows:

$$T_R = \lambda T_S = \lambda(T_G^* + I_G \alpha_G)$$

Thus, the ring gear torque $T_R$ can be calculated from the generator target torque $T_G^*$. This processing can also adopt, only when the generator brake is ON, a mode in which the ring gear torque ($T_R$) is estimated from the engine torque ($T_E$: taught from the engine control unit) by using the torque balancing equation (2) of the planetary.

At next Step S19, there is determined the drive motor target torque ($T_M^*$). This processing is determined from the difference between the vehicle demand torque ($T_{OUT}^*$) and the drive shaft torque ($T_R \to _{OUT}$). Finally, the drive motor control is made at Step S20, and the series of flows are ended to return to the initial Step. If the routine transfers to the abrupt acceleration control of Step S10, all the subsequent Steps are skipped to return directly to the initial Step, as shown by symbol B.

Next, here will be described the individual subroutines in the aforementioned main flow.

(Abrupt Acceleration Control)

Figure 10:
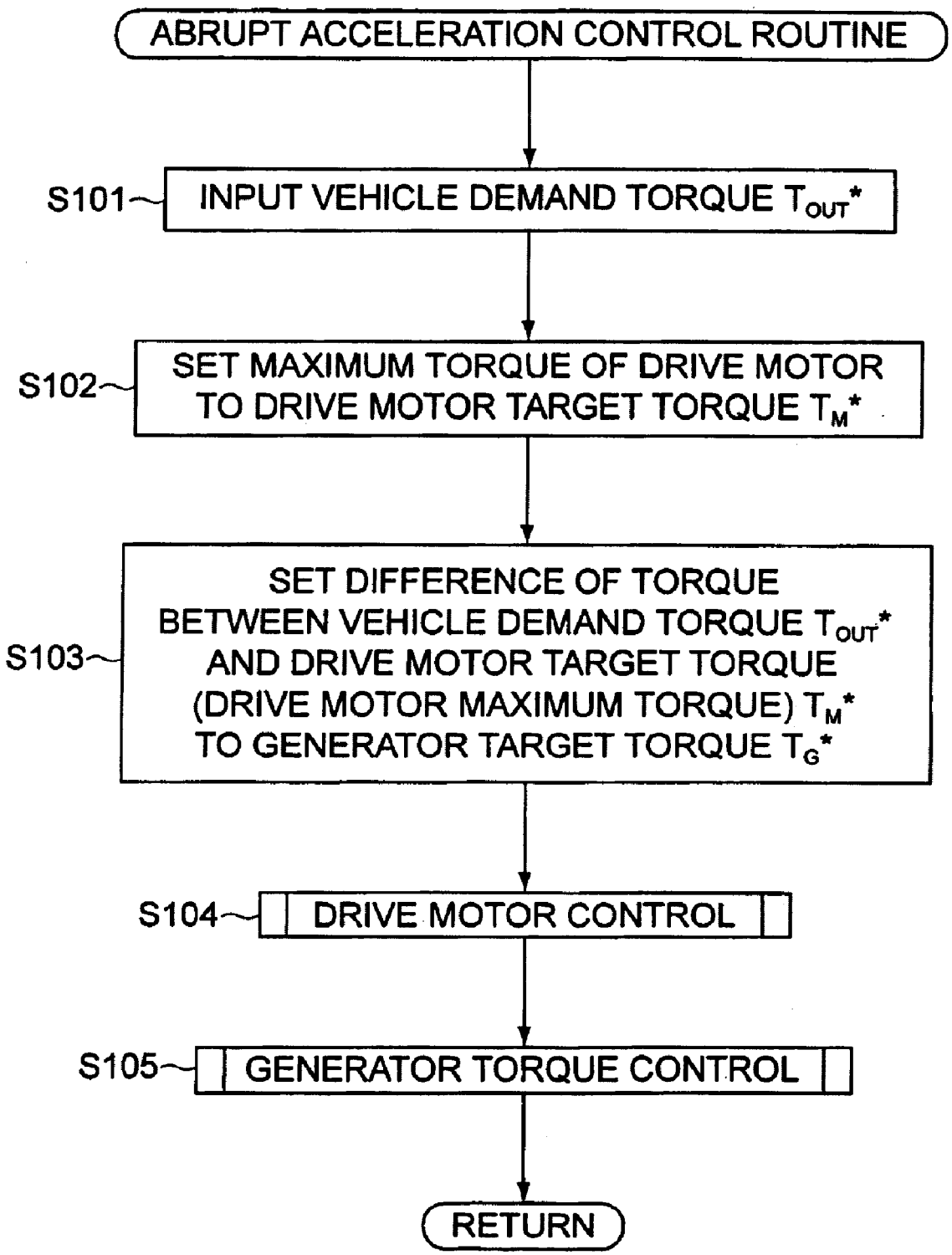
FIG. 10 is a flow chart of an abrupt acceleration control routine.

First of all, in the abrupt acceleration control routine at Step S10 in the main flow, as shown in FIG. 10, the vehicle demand torque ($T_{OUT}^*$) determined at preceding Step S3 is inputted at Step S101, and the drive motor target torque ($T_M^*$) is set with the maximum torque of the drive motor at next Step S102. At next Step S103, moreover, the differential torque between the vehicle demand torque ($T_{OUT}^*$) and the drive motor target torque (or drive motor maximum torque) ($T_M^*$) is calculated to set the shortage for the drive motor maximum torque as the generator target torque ($T_G^*$). On the basis of these settings, the drive motor control is performed at next Step S104 according to the drive motor target torque ($T_M^*$), and the generator torque control is performed at Step S105 according to the generator target torque ($T_G^*$).

(Drive Motor Control)

Figure 11:
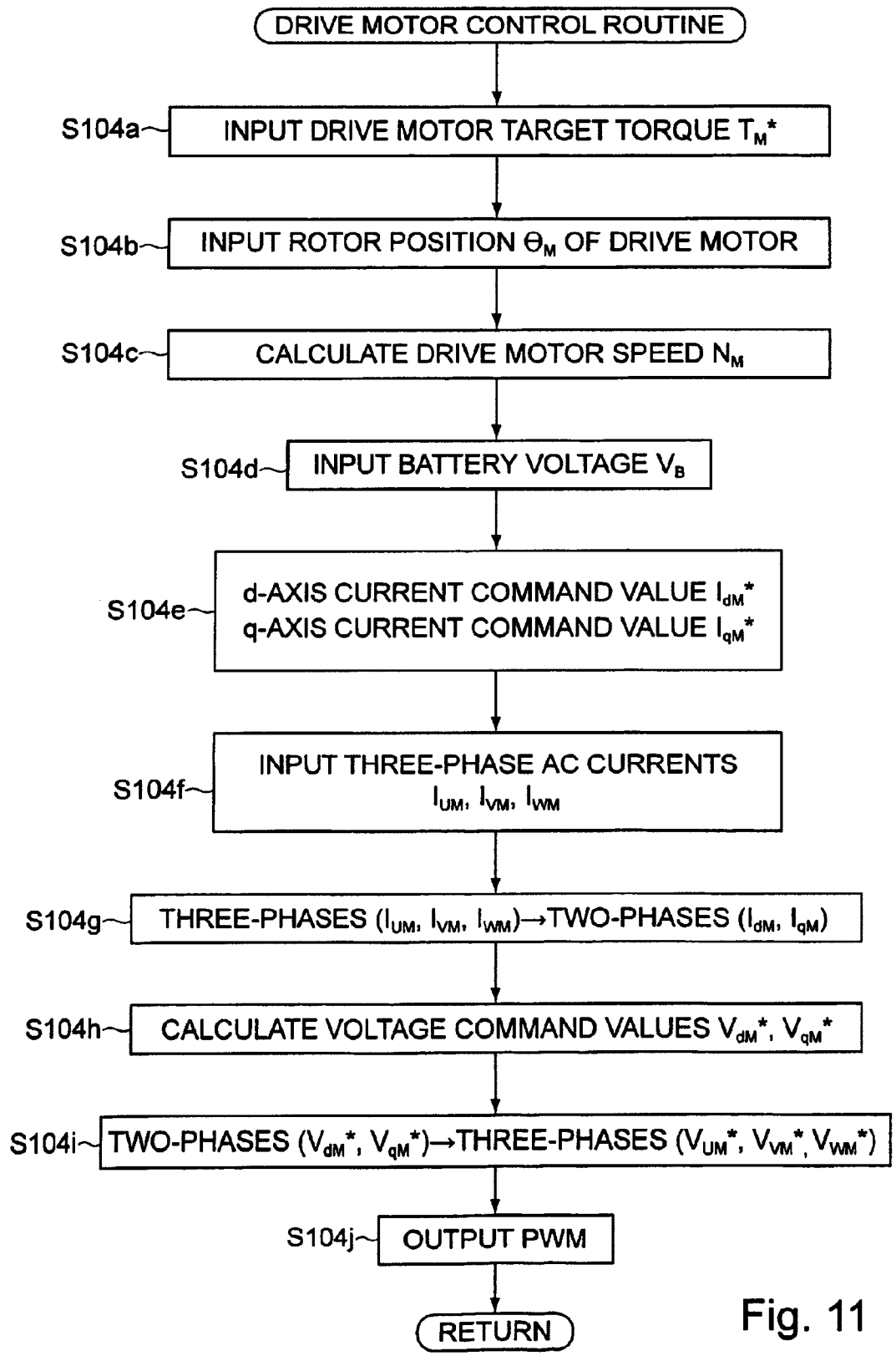
FIG. 11 is a flow chart of a drive motor control routine.

In the drive motor control routine of Step S104 of FIG. 10, as shown in FIG. 11, the drive motor target torque ($T_M^*$) is inputted at Step S104a. Moreover, the rotor position ($\theta_M$) of the drive motor is inputted at Step S1104b. These inputs may be detected with or without a position sensor such as a resolver. Moreover, the drive motor speed ($N_M$) is calculated at Step S104c. This calculation can be made in this embodiment from the changing rate of the rotor position ($\theta_M$) of the drive motor. In another embodiment, a rotation sensor can be separately adopted for the detection. Moreover, the battery voltage ($V_B$) is inputted at Step S104d. At next Step S104e, there are determined a d-axis current command value ($I_{dM}^*$) and a q-axis current command value ($I_{qM}^*$). These determinations are made with reference to the not-shown map from the drive motor target torque ($T_M^*$), the drive motor speed ($N_M$) and the battery voltage ($V_B$) inputted at preceding Steps. Subsequently, the three-phase AC currents ($I_{UM}$, $I_{VM}$, $I_{WM}$) are inputted at Step S104f. The U- and V-phase current values ($I_{UM}$, $I_{VM}$) are determined by using the current sensors Sn12 and Sn13, and the W-phase current value ($I_{WM}$) is determined from the relation of $I_{WM} = I_{UM} - I_{VM}$. In the case of another system mode having current sensors for all three phases, it is quite natural that the current values are directly determined by the individual current sensors. At next Step S104g, there are made conversions of three phases ($I_{UM}$, $I_{VM}$, $I_{WM}$) to two phases ($I_{dM}$, $I_{qM}$). On the basis of these numerical values, moreover, the voltage command values ($V_{dM}^*$, $V_{qM}^*$) are so calculated at next Step S1104h that the individual differences between ($I_{dm}$, $I_{qM}$) and the d-axis current command value ($I_{dM}^*$) and the q-axis current command value ($I_{qM}^*$) may be reduced to 0. On the basis of these numerical values determined, at Step S104i, there are made conversions of the two phases ($V_{dM}^*$, $V_{qM}^*$) to three phases ($V_{UM}^*$, $V_{VM}^*$, $V_{WM}^*$). Finally, the voltage command values ($V_{UM}^*$, $V_{VM}^*$, $V_{WM}^*$) thus determined are subjected to pulse width modulations and are outputted as the PWM (Pulse Width Modulation) signals to the inverter InM at Step S104j.

(Generator Torque Control)

Figure 12:
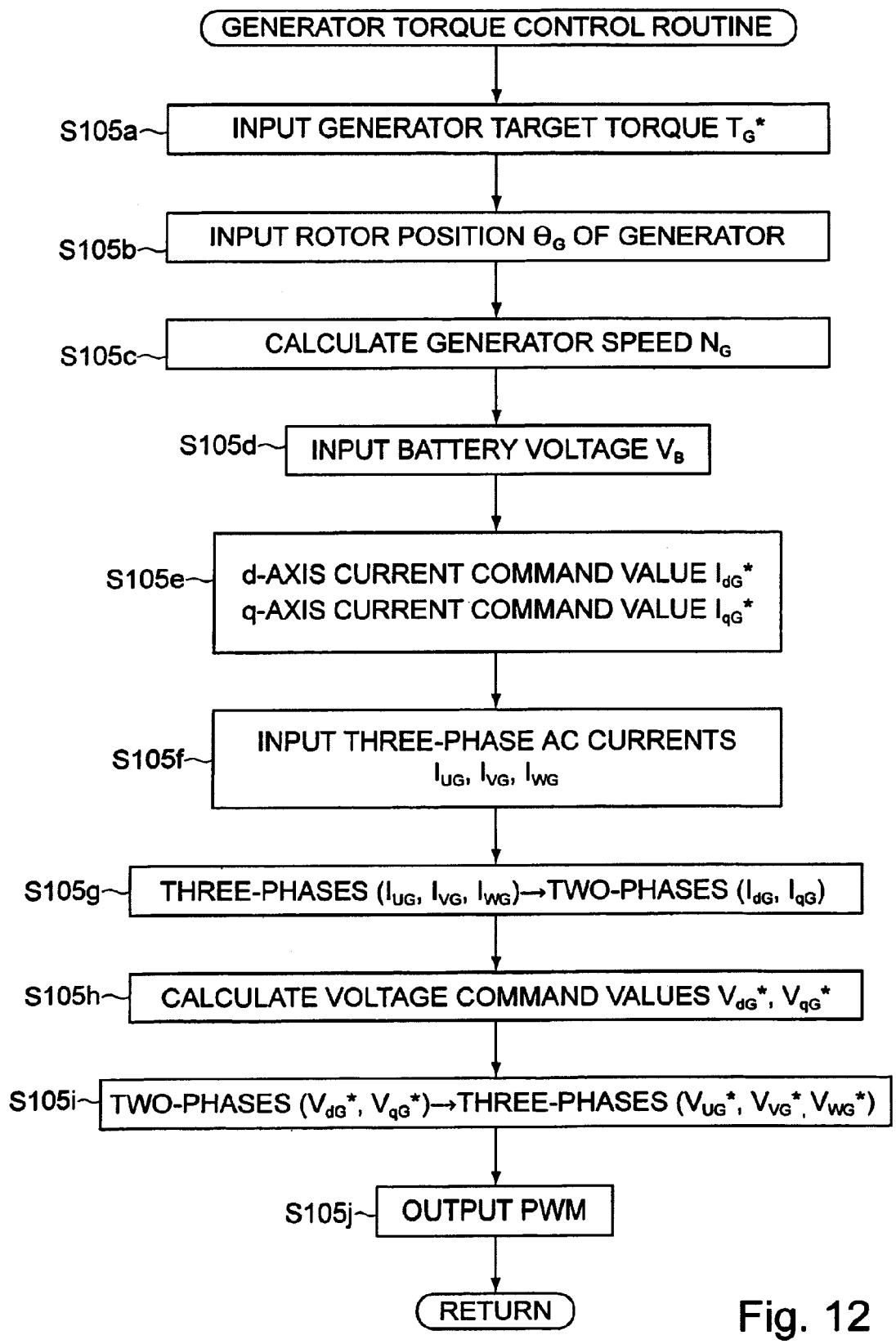
FIG. 12 is a flow chart of a generator torque control routine.

In the generator control routine of Step S105 of FIG. 10, as shown in FIG. 12, the generator target torque ($T_G^*$) is inputted at Step S105a. Moreover, the rotor position ($\theta_G$) of the generator is inputted at Step S105b. These inputs may be detected with or without a position sensor such as a resolver. Moreover, the generator speed ($N_G$) is calculated at Step S105c. This generator speed ($N_G$) is determined in this embodiment from the changing rate of the rotor position ($\theta_G$) of the generator. In another embodiment, a rotation sensor can be separately adopted for the detection. Moreover, the battery voltage ($V_B$) is inputted at Step S105d. At Step S105e, there are determined ad-axis current command value ($I_{dG}^*$) and a q-axis current command value ($I_{qG}^*$). These determinations are made with reference to the not-shown map from the generator target torque ($T_G^*$), the generator speed ($N_G$) and the battery voltage ($V_B$) inputted at preceding Steps. Subsequently, the currents ($I_{UG}$, $I_{VG}$, $I_{WG}$) are inputted at Step S105f. The U- and V-phase current values ($I_{UG}$, $I_{VG}$) are determined by using the current sensors Sn10 and Sn11, and the W-phase current value ($I_{WG}$) is determined from the relation of $I_{WG} = I_{UG} - I_{VG}$. In the case of another system mode having current sensors for all three phases, it is quite natural that the current values are directly determined by the individual current sensors. At next Step S105g, there are made conversions of three phases ($I_{UG}$, $I_{VG}$, $I_{WG}$) to two phases ($I_{dG}$, $I_{qG}$). On the basis of these numerical values, moreover, the voltage command values ($V_{dG}^*$, $V_{qG}^*$) are so calculated at next Step S105h that the individual differences between ($I_{dG}$, $I_{qG}$) and the d-axis current command value ($I_{dG}^*$) and the q-axis current command value ($I_{dG}^*$) may be reduced to 0. On the basis of these numerical values determined, at Step S105i, there are made conversions of the two phases ($V_{dG}^*$, $V_{qG}^*$) to three phases ($V_{UG}^*$, $V_{VG}^*$, $V_{WG}^*$). Finally, the voltage command values ($V_{UG}^*$, $V_{VG}^*$, $V_{WG}^*$) thus determined are subjected to pulse width modulations and are outputted as the PWM (Pulse Width Modulation) signals to the inverter InG at Step S1105j.

(Generator Speed Control)

Figure 13:
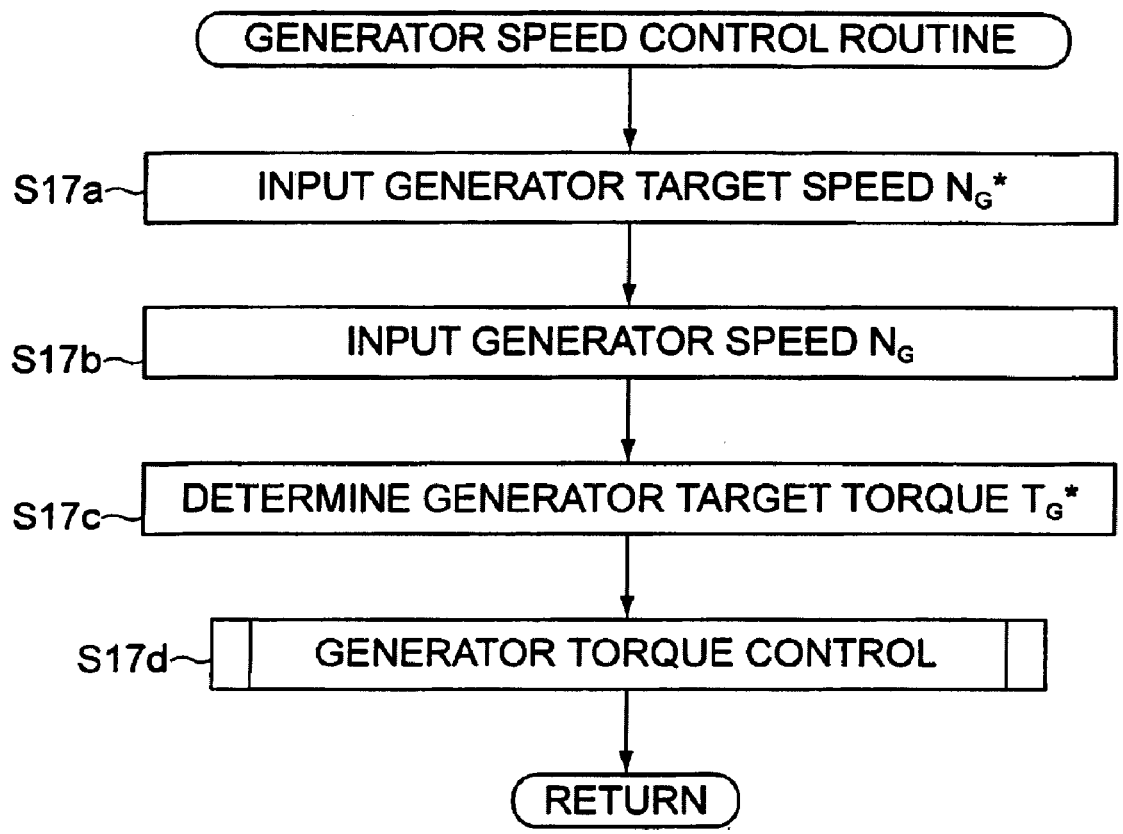
FIG. 13 is a flow chart of a generator speed control routine.

Next, here will be described the generator speed control routine of Step S17 of FIG. 6. FIG. 13 shows a flow of the generator speed control routine. In this flow, the input of the generator target speed ($N_G^*$) is inputted at first Step S17a. Moreover, the generator speed ($N_G$) is inputted at Step S17b. Then, the generator target torque ($T_G^*$) is determined at Step S17c. This generator target torque ($T_G^*$) is determined by the PI control (in which the generator target torque ($T_G^*$) is made the larger considering its plus and minus for the larger difference between the generator target speed ($N_G^*$) and the generator speed ($N_G$) inputted at preceding Steps). On the basis of the generator target torque ($T_G^*$) thus determined, the generator torque control is made at next Step S17d. The contents of the generator torque control of this case are similar to those described in the preceding generator torque control routine.

(Generator Brake ON Control)

Figure 14:
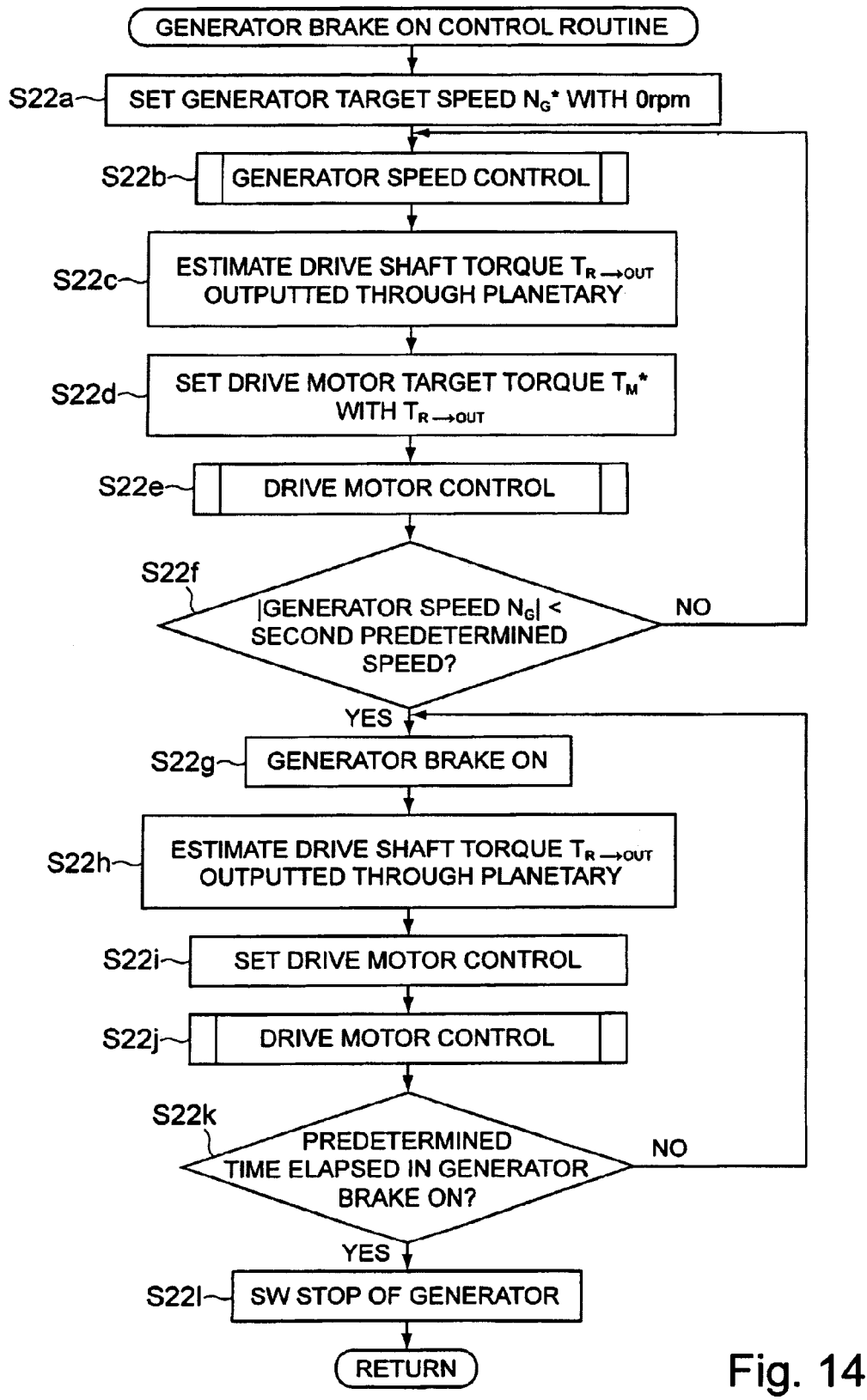
FIG. 14 is a flow chart of a generator brake ON control routine.

Next, here will be described the generator brake ON control routine at Step S22 of FIG. 6. FIG. 14 is a flow chart of the generator brake ON control routine. In this flow chart, the generator target speed (NG*) is set with 0 rpm at Step S22a. The generator speed control is then executed at Step S22b. The contents of this control are similar to those described in the preceding generator speed control routine. At next Step S22c, there is estimated the drive shaft torque ($T_R \rightarrow_{OUT}$) which is outputted through the planetary. At Step S22d, moreover, the drive motor target torque ($T_M^*$) is set with the estimated drive shaft torque ($T_R \rightarrow_{OUT}$). Thus, the drive motor control is executed at next Step S22e. The contents of this control are similar to those described in the preceding drive motor control routine. In the controls from Step S22c to Step S22e, the drive shaft torque ($T_R \rightarrow_{OUT}$) to be outputted from the generator through the planetary is negated by the drive motor while the generator speed control is being executed at Step S22b that it may not be transmitted as shocks to the wheel. Under this control, it is decided at Step S22f whether the absolute value of the generator speed ($N_G$) is less than a second predetermined value (e.g., 100 rpm). So long as this decision does not hold, moreover, the loop returning to Step S22b is repeated. When the decision of Step S22f holds, moreover, the routine advances to Step S22g, at which the generator brake is turned ON.

With the generator brake ON, the drive shaft torque ($T_R \rightarrow_{OUT}$) to be outputted through the planetary is estimated at Step S22h, and the drive motor target torque ($T_M^*$) is set with the estimated drive shaft torque ($T_R \rightarrow_{OUT}$) at Step S22i. Thus, the drive motor control is executed at next Step S22j. The contents of this control are similar to those described in the preceding drive motor control routine. In the controls from Step S22h to Step S22j, too, the drive shaft torque ($T_R \rightarrow_{OUT}$) to be outputted from the generator through the planetary is negated by the drive motor while the generator speed control is being executed at Step S22b that it may not be transmitted as shocks to the wheel. Under this control, it is decided at Step S22k whether a predetermined time has elapsed with the generator brake being ON. This timer decision is made as the standby time until the rotation of the generator is actually stopped by the generator brake ON. When the rotational stop of the generator is thus warranted, the SW (Switching) of the generator is stopped at next Step S22l, and this routine is ended and returned.

(Generator Brake OFF Control)

Figure 15:
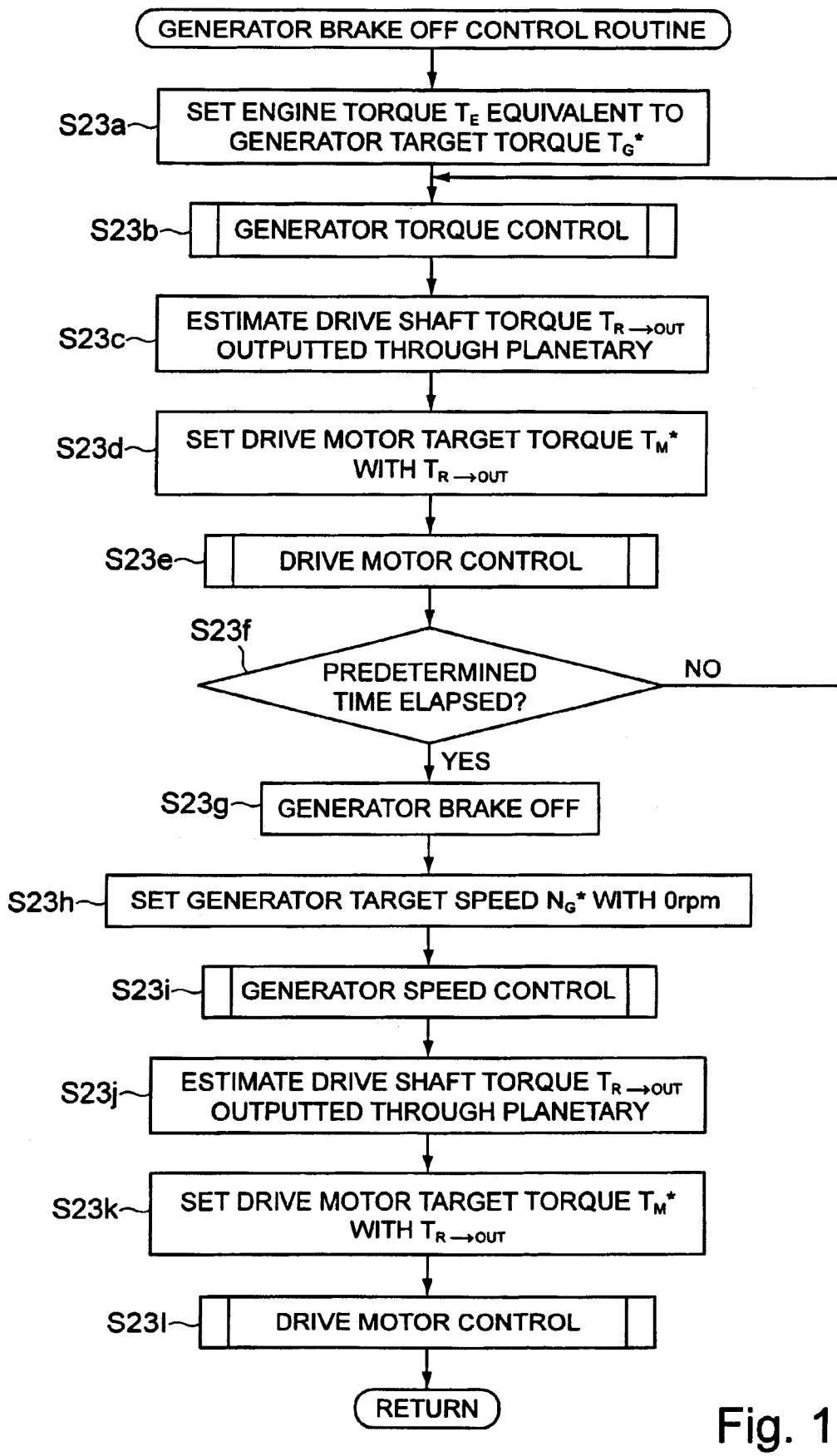
FIG. 15 is a flow chart of a generator brake OFF control routine.

Next, here will be described the generator brake OFF control routine at Step S23 of FIG. 6. FIG. 15 shows a flow chart of the generator brake OFF control routine. In this flow chart, the correspondence to the engine torque ($T_E$) is set with the generator target torque ($T_G^*$) at Step S23a, and the generator torque control is accordingly made at Step S23b. In this state, moreover, the drive shaft torque ($T_R \rightarrow_{OUT}$) to be outputted through the planetary is estimated at Step S23c, and the drive motor target torque ($T_M^*$) is set with the estimated drive shaft torque ($T_R \rightarrow_{OUT}$) at Step S23d. The drive motor control is then executed at Step S23e. The contents of this control are similar to those described in the preceding drive motor control routine.

In the controls from Step S23c to Step S23e, the drive shaft torque ($T_R \rightarrow_{OUT}$) to be outputted from the generator through the planetary is negated by the drive motor while the generator speed control is being executed at Step S23b that it may not be transmitted as shocks to the wheel. Until a predetermined time has elapsed as determined at Step S23f, the routine returns to the generator torque control of Step S23b, and the subsequent operations are repeated. When it has been determined that the predetermined time elapsed at Step S23f, the routine advances to next Step S23g, at which time the generator brake is turned OFF. At subsequent Step S23h, the generator target speed (NG*) is set to 0 rpm. At Step S23i, the generator speed control is executed. The contents of this control are similar to those described in the preceding generator speed control routine. While the generator speed control is being made, the drive shaft torque ($T_R \rightarrow_{OUT}$) to be outputted through the planetary is estimated at Step S23j, and the drive motor target torque ($T_M^*$) is accordingly set at Step S23k with the estimated drive shaft torque ($T_R \rightarrow_{OUT}$). Finally, the drive motor control is executed at Step S23l. The contents of this control are similar to those described in the preceding drive motor control routine. In the controls from Step S23j to Step S23l, the drive shaft torque ($T_R \rightarrow_{OUT}$) to be outputted from the generator through the planetary is so negated by the drive motor while the generator speed control is being executed at Step S23j that it may not be transmitted as shocks to the wheel. When the drive motor control state is thus established, this routine is ended and returned.

(Engine Stop Control)

Figure 16:
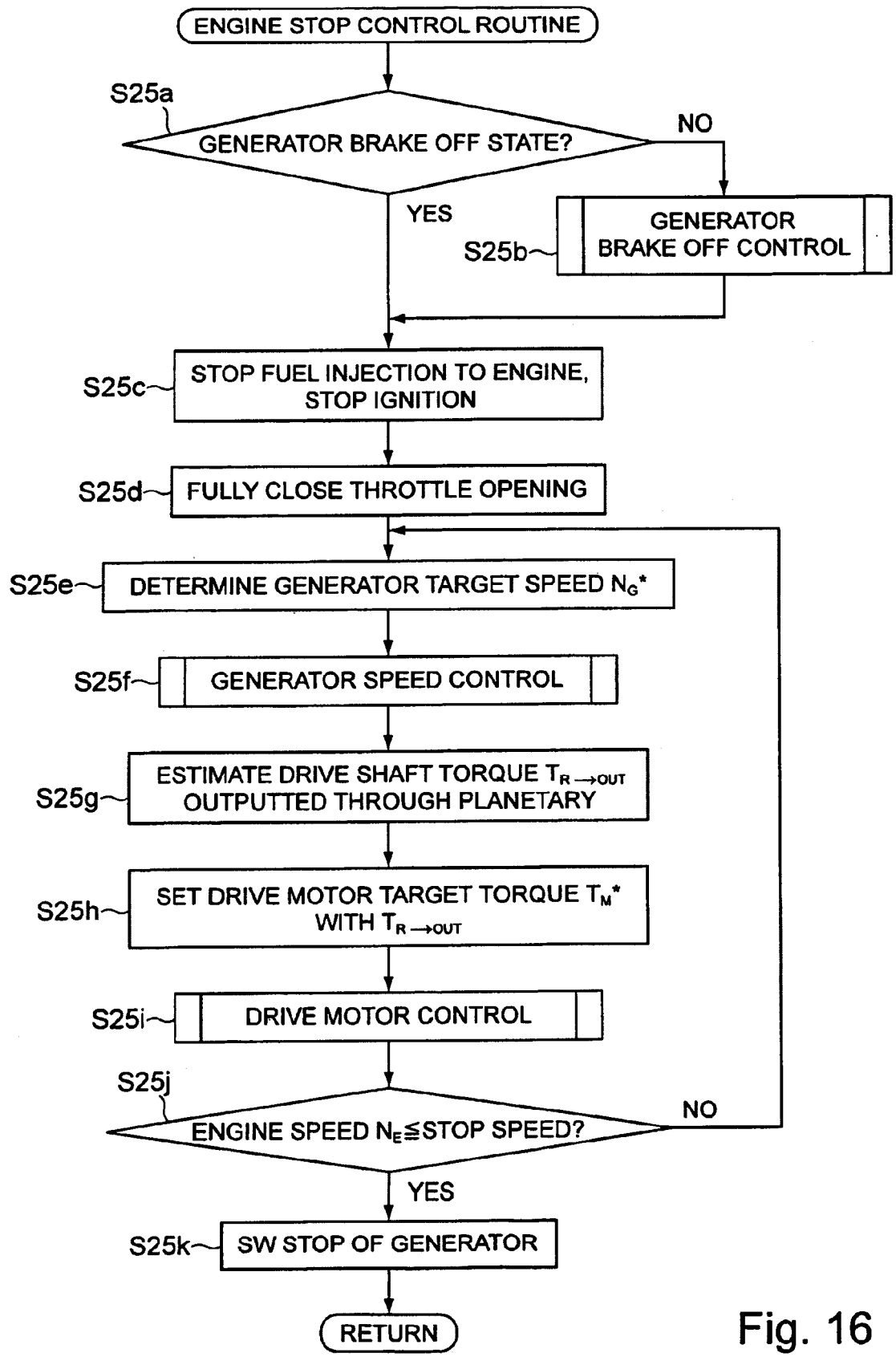
FIG. 16 is a flow chart of an engine stop control routine.

Next, here will be described the engine stop control routine at Step S25 of FIG. 6. FIG. 16 shows a flow chart of the engine stop control routine. In this control, it is decided at first Step S25a whether the generator brake is OFF. If this decision does not hold, the generator brake OFF control is made at Step S25b to bring the generator into a rotatable state. At Step S25c, moreover, there are performed the operations to inject the fuel into the engine and to stop the ignition. Moreover, the throttle opening is fully closed at Step S25d, and the generator target speed ($N_G^*=0$) is determined at Step S25e so as to stop the engine promptly. According to this decision, moreover, the generator speed control is made at Step S25f. At Step S25g, moreover, there is estimated the drive shaft torque ($T_R \rightarrow_{OUT}$) which is outputted in this state through the planetary. At Step S25h, moreover, the drive motor target torque ($T_M^*$) is set with the estimated drive shaft torque ($-T_R \rightarrow_{OUT}$). Moreover, the drive motor control is made at Step S25i. The contents of this control are also similar to those described in the preceding drive motor control routine. In the controls from Step S25g to Step S25i, the drive shaft torque ($T_R \rightarrow_{OUT}$) to be outputted from the generator through the planetary is so negated by the drive motor while the generator speed control is being executed at Step S25f that it may not be transmitted as shocks to the wheel. When it is decided at Step S25j that the engine speed ($N_E$) is less than or equal to the stop speed, the SW (Switching) of the generator is stopped at Step S25k, and this routine is ended and returned.

(Engine Start Control)

Figure 17:
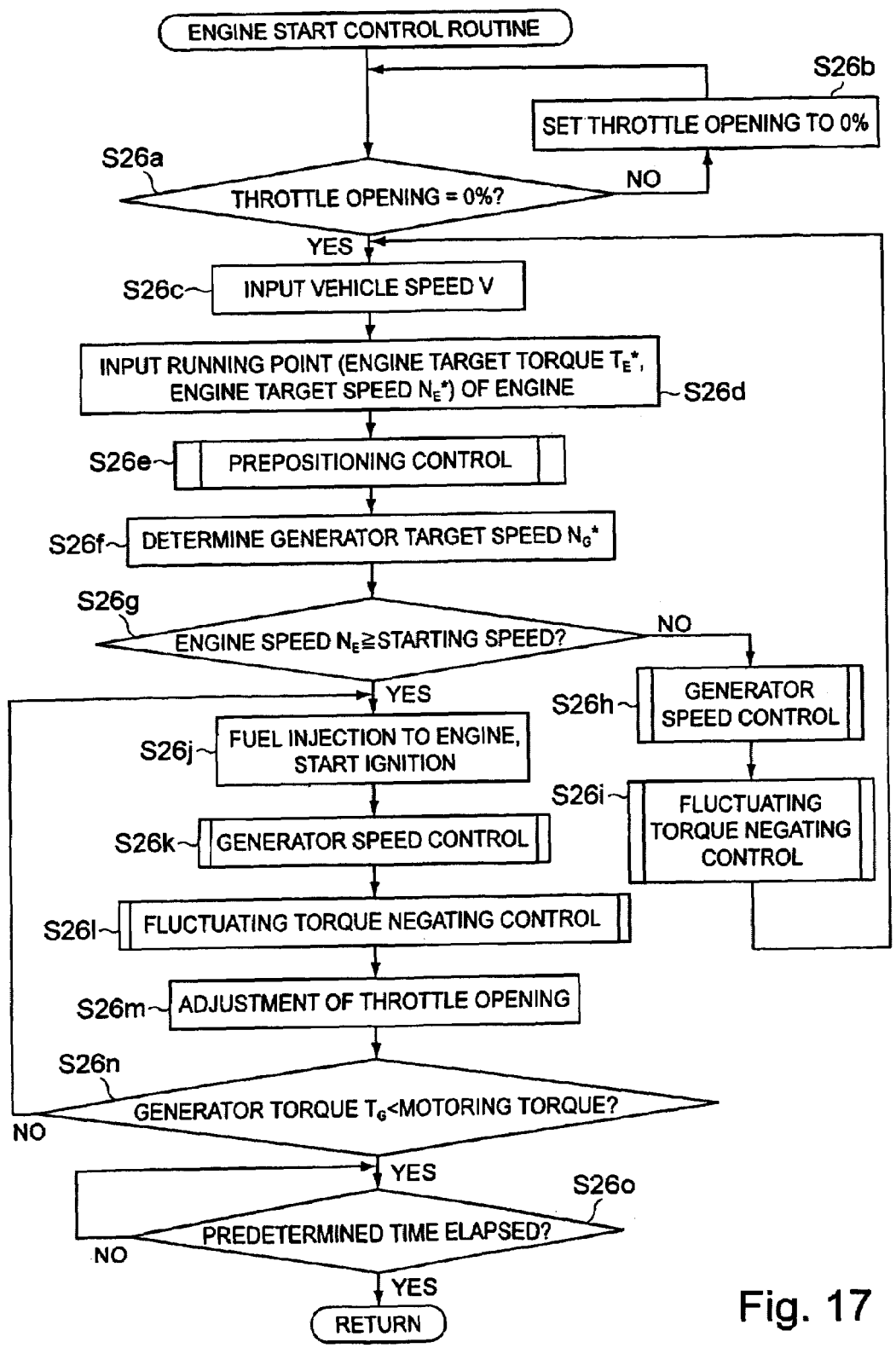
FIG. 17 is a flow chart of an engine start control routine.

Next, here will be described the engine start control routine at Step S26 of FIG. 6. FIG. 17 shows a flow chart of the engine start control routine. In this control, the operation to set the throttle opening to a default of 0% is performed at first. For this, the throttle opening=0% is decided at first Step S26a. If this decision is not satisfied, the throttle opening is set to 0% at Step S26b by the output of the engine control unit $U_E$. Under this condition satisfied, moreover, the vehicle speed (V) is inputted at Step S26c. Next, the running point (e.g., the engine target torque $T_E^*$, the engine target speed $N_E^*$) of the engine is inputted at Step S26d. In order that the rotationally stopped engine may be positioned at a predetermined crank-shaft position, moreover, the prepositioning control according to the present invention is made at next Step S26e. These contents will be described in detail. Next, the generator target speed ($N_G^*$) is determined at Step S26f. Subsequently, it is decided at Step S26g whether the engine speed ($N_E$) is greater than or equal to the starting speed. If this decision does not hold at first, and the routine transfers to Step S26h, at which the generator speed control is executed to raise the engine speed. In order to negate the resultant fluctuations of the drive shaft output torque, the (later described) fluctuating torque negating control is made at Step S26i, and the routine returns to the Step S26c to input the vehicle speed (V). If the decision of Step S26g holds so that it is confirmed that the conditions for the engine speed are satisfied. At Step S26j, the fuel is then injected to the engine, and the ignition is started. After this, the generator speed control at Step S26k and the (later described) fluctuating torque negating control at Step S26l is performed. Moreover, the throttle opening is adjusted at Step S26m. At next Step S26n, the engine start is confirmed by deciding whether the generator torque ($T_G$) is less than the motoring torque. After this, at final Step S26o, it is decided whether a predetermined time for waiting the stability of the engine speed has elapsed. When this decision holds, this routine is ended and returned.

(Prepositioning Control)

Next, here will be described a prepositioning control during the engine start control according to the invention. The engine start in the preceding engine start control is effected by causing the generator 2 to output a sufficient torque for running the engine 1 continuously (i.e., the control of Step S26h shown in FIG. 17), by deciding that the predetermined speed (e.g., the idling speed) is reached (i.e., the decision of Step S26g shown in FIG. 17), and by starting the fuel injection/the ignition (i.e., at Step S26k shown in FIG. 17). In this case, the drive shaft torque ($T_R \rightarrow_{OUT}$) to be outputted through the planetary by the speed control of the generator 2 is expressed by:

$$T_R \rightarrow_{OUT} = (T_G - I_G \omega_G) \alpha,$$

where:
  TC: is the Counter Shaft Torque;
  $T_G$: is the Generator Torque;
  $I_G$: is the Generator Inertia;
  $\omega_G$: is the Generator Angular Acceleration; and
  $\alpha$: is the Gear Ratio Considering Planetary and Counter.

By correcting and outputting the aforementioned correspondence to the torque by the drive motor 3, it is possible to negate the torque fluctuations of the drive shaft. A drive motor correcting torque of this case is expressed by:

$$\Delta T_M = T_{OUT}^* - T_R \rightarrow_{OUT},$$

where:
  $T_{OUT}^*$: is the Vehicle Demand Torque.

The generator angular velocity $\omega_G$ of the aforementioned case fluctuates with the engine rotating load. For detecting the angular velocity, therefore, there are necessary highly precise generator rotor position detecting devices and a processor capable of processing the result at a high speed. In order to eliminate this necessity, according to the invention, the crank-shaft position control for positioning the engine 1 being fuel-cut at a predetermined cranking starting position is made by the vehicle control unit U by motoring the generator 2.

Figure 18:
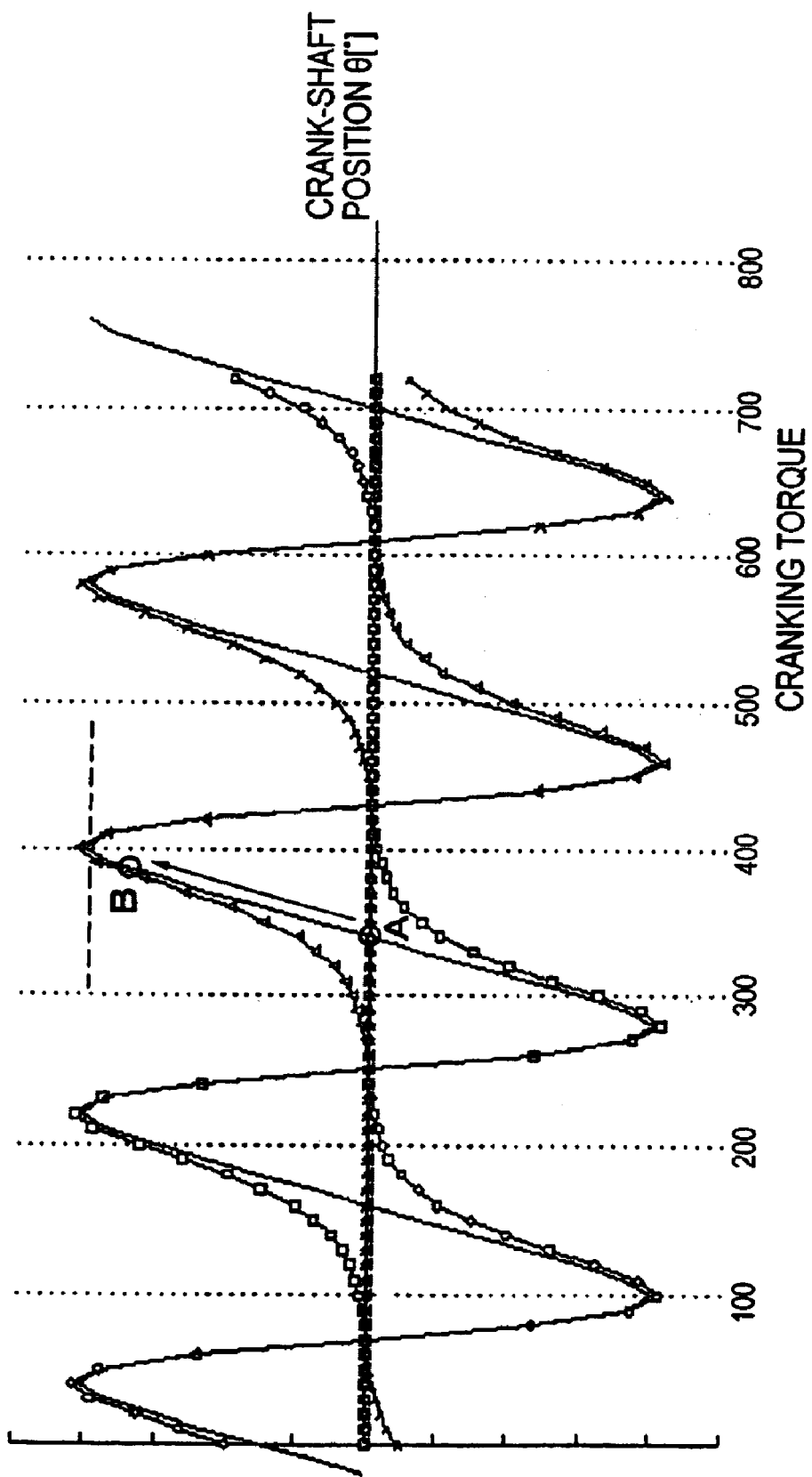
FIG. 18 is an engine cranking torque characteristic diagram.

FIG. 18 shows the relation between the crank angle of a four-cylinder engine and a cranking torque schematically. This relation is determined mainly by synthesizing the relations (in which symbols O, □, ∆ and X indicate the torques of individual cylinders) between the strokes of the pistons in the individual cylinders and the expansion/compression of the combustion chamber volume, as well known in the art. In the relations, the cranking torque increases, when the compression advances in a specific cylinder, and decreases when the top dead center is passed. In the actual cranking load, however, once the rotation of the engine starts, the inertia torque acting at first as the rotation resistance but acts, when the flywheel inertia occurs, as an element to suppressing the torque fluctuations. Therefore, the torque is characterized to grow extremely high at the rising time of the rotation but then to take a lower substantially constant value with a few fluctuations. Due to the dispersion of the crank angle determined by the state in which the engine is stopped, therefore, the cranking load for raising the rotation at the beginning of the cranking has high fluctuations.

To make the cranking load for causing the initial rise of rotation at the aforementioned cranking substantially constant, therefore, the invention resides in that the control to rotate the engine having stopped or to stop at the circled A position (indicating the general position to be naturally taken at the engine stop time because the rotation load is near substantially 0) to the circled B position (indicating the position which cannot be usually taken when the rotation load is so high that the engine naturally stops but which is not always limited to the close vicinity before the torque position is at the minimum necessary for causing the engine to continuously run over the first peak load, as indicated by a broken line), that is, the control (as termed herein as the "crank-shaft position control") is made prior to the cranking. With this gist, the prepositioning control, at which the invention aims, is made in the state where none of the fuel injection and ignition of the engine and the adjustment of the throttle opening is done no matter whether the engine is being stopped or rotated. Therefore, the "engine being stopped in running", as termed in the invention, implies the aforementioned state but does not always imply the engine being stopped in rotation.

Figure 19:
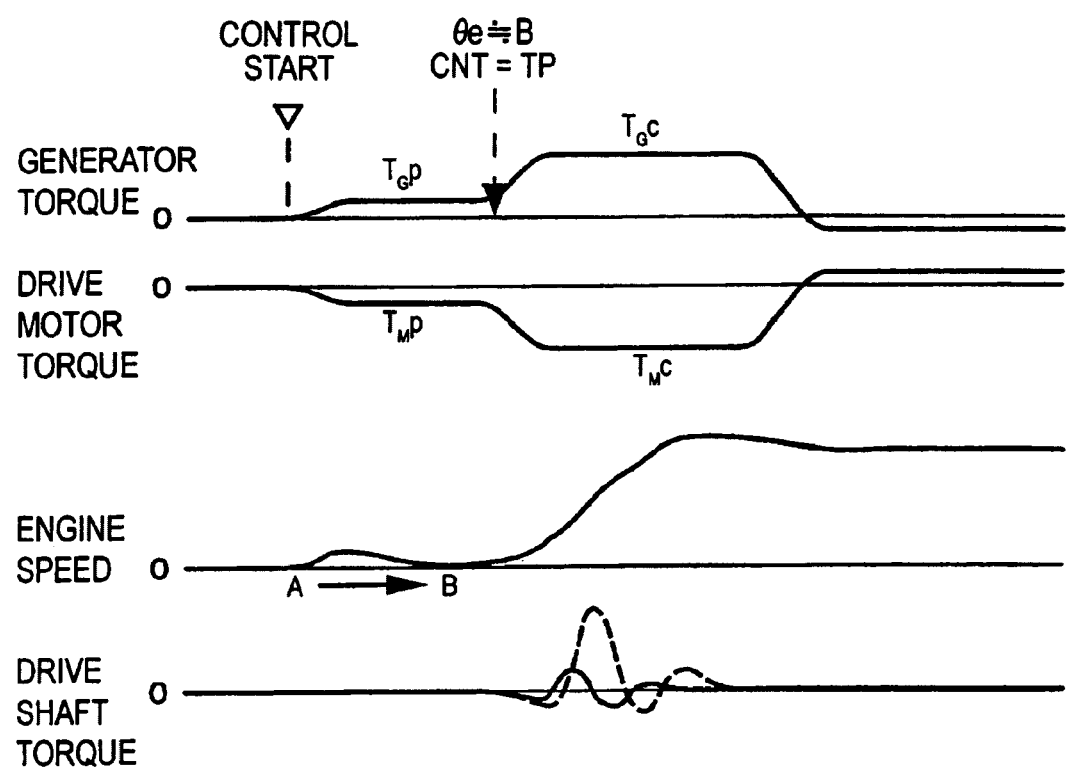
FIG. 19 is a time cart of a prepositioning control in an engine start control of a first embodiment.

FIG. 19 shows a time chart of the control of a first embodiment of the prepositioning control. According to this embodiment, before the cranking torque ($T_G$ c) is outputted to the generator, the crank-shaft position adjusting torque ($T_G$ p) is outputted to rotate the engine discontinuously from the A position to the B position, as specified hereinbefore, thereby to make the crank-shaft position control to the predetermined cranking starting position. This predetermined cranking starting position may be located, as will be described hereinafter, at a predetermined crank angle position by detecting it, may be warranted by a lapse of a constant time period by multiplying a predetermined torque lower than the torque necessary for starting the engine, or may combine them. Along with this, the output shaft torque fluctuation is prevented by causing the motor to output the torque which is calculated by subtracting a negating torque ($T_M$ p) for reducing the generator torque component to 0 on the output shaft from the drive torque (i.e., the aforementioned vehicle demand torque $T_{OUT}^*$) necessary for the vehicle to run. Here, only the torque of this correction is indicated as the drive motor torque.

After the crank-shaft position was thus set at the B position, the routine then transfers to Step S26f, at which the generator is caused to output a cranking torque ($T_G$ c) sufficient for rotating the engine continuously, thereby to effect the engine start. In this case, too, the output shaft torque fluctuation is prevented by outputting the torque ($T_M$ c) for correcting the cranking torque to the drive motor.

By this control, the drive shaft torque slightly fluctuates at the beginning of the cranking, as indicated by a solid curve, but can be suppressed lower at its peak value than the torque fluctuation of the cranking case from the A position, as indicated by a broken curve. This fluctuation is caused by the fluctuation of the cranking torque of the engine according to the crank angle, as shown in FIG. 18. Where especially the B position is set extremely close to this side of the peak load level, as indicated by a broken curve in FIG. 18, the cranking torque ($T_G$ c) output according to that high torque load is high from the beginning so that the rise of the engine speed from the shown B position is quickened to shorten the time period for the torque fluctuation to occur.

Figure 20:
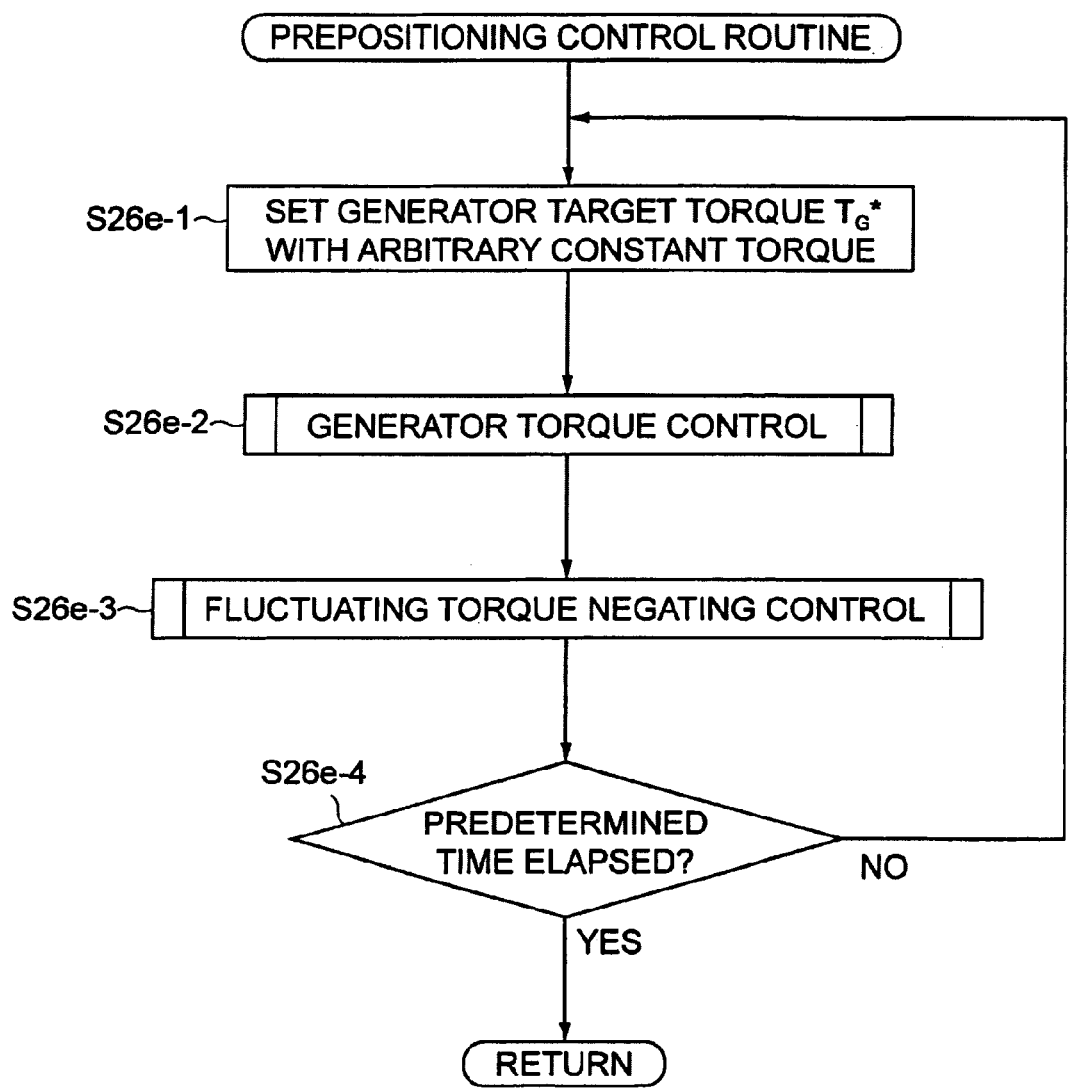
FIG. 20 is a flow chart of the prepositioning control routine.
Figure 21:
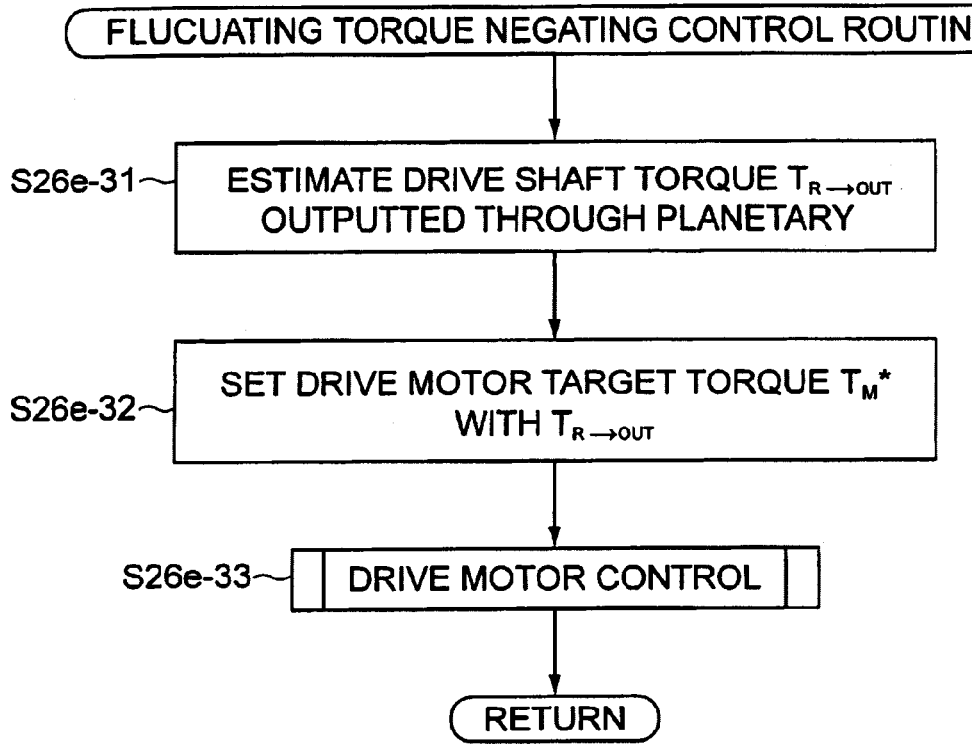
FIG. 21 is a flow chart of a fluctuating torque negating control routine.
Figure 22:
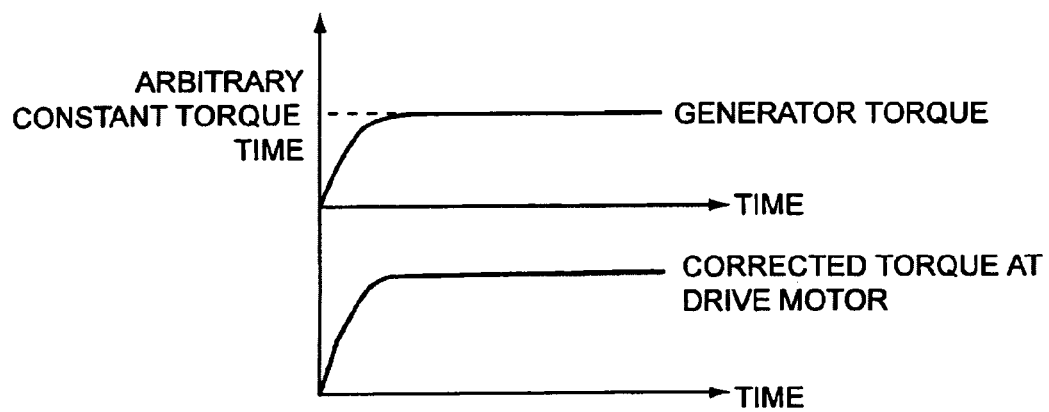
FIG. 22 is a torque correction map.

FIG. 20 shows a flow chart of the case in which the aforementioned operations are done by a timer control. In this prepositioning control, the generator target torque ($T_G^*$) is set with an arbitrary constant torque at Step S26e-1. The constant torque of this case is exemplified by 1.5 [Nm], i.e., a torque lower than that necessary for starting the engine. According to this setting, a generator torque control similar to the aforementioned one is made at Step S26e-2, and a fluctuating torque negating control is made at Step S26e-3. One pattern for the fluctuating torque negating control of this case is shown in a flow chart in FIG. 21. In this fluctuating torque negating control routine: the drive shaft torque ($T_R \rightarrow _{OUT}$) to be outputted through the planetary is estimated at first Step S26e-31 by a method similar to the aforementioned one; the drive motor target torque ($T_M^*$) is set at Step S26e-32 with the torque for negating that torque simply, i.e., $-T_R \rightarrow _{OUT}$; and the drive motor control having contents similar to the aforementioned ones is accordingly executed at Step S26e-33. Reverting to FIG. 20, the decision on a predetermined time is thus made at final Step S26e-4. The predetermined time of this case is exemplified by 0.3 seconds. Here, the correction torque to be set in the aforementioned drive motor target torque ($T_M^*$) can be set by the calculation, as described hereinbefore. In another method, however, the map of the correction torque in the drive motor, as corresponding to the generator torque adjusted to an arbitrary constant torque, as shown in FIG. 22, could be set in the memory of the vehicle control unit U and used to set the correction torque.

Figure 23:
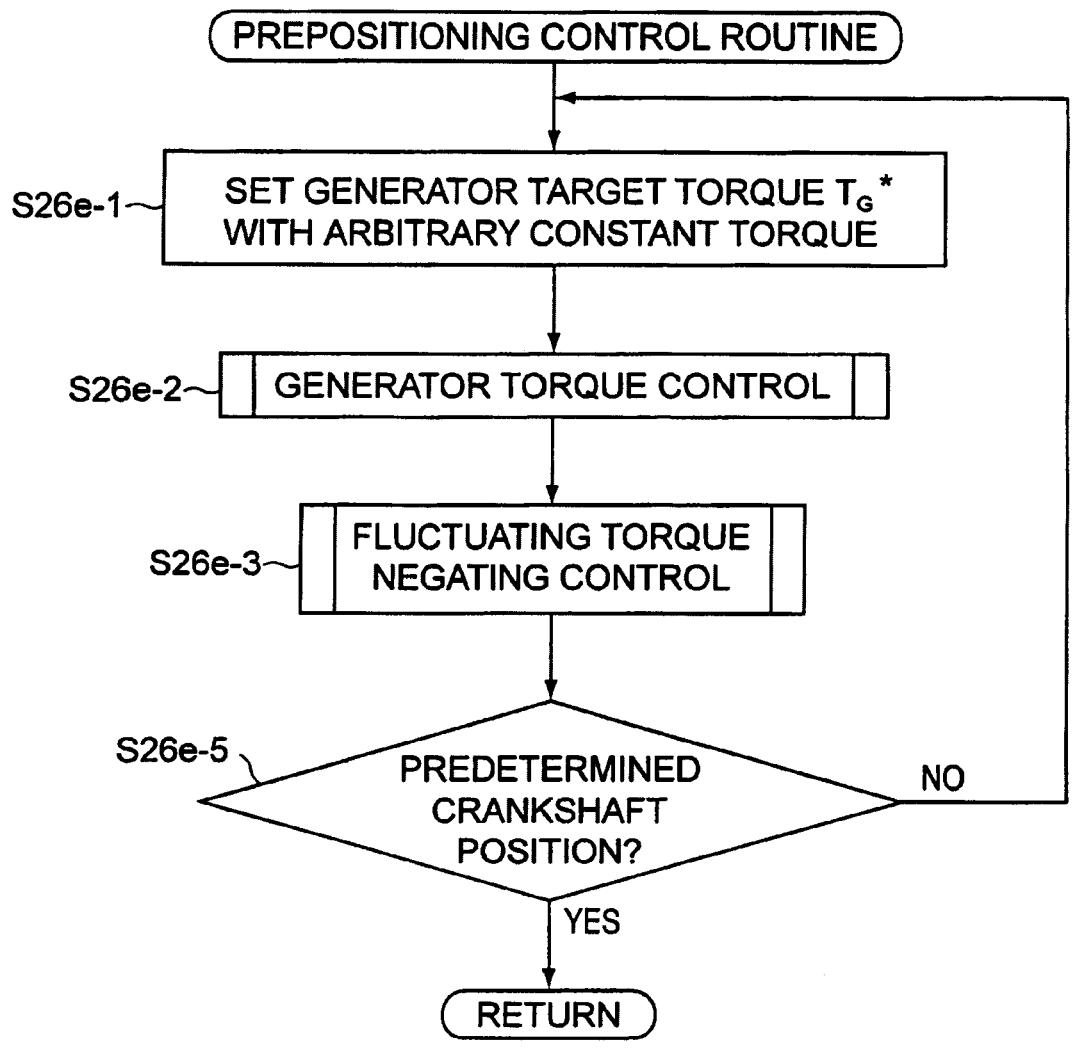
FIG. 23 is a flow chart of a prepositioning control routine of a second embodiment.
Figure 24:
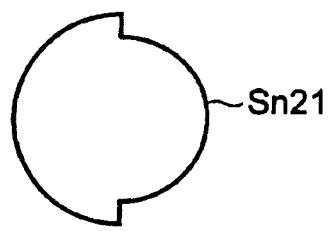
FIG. 24 is a schematic diagram of a detector of a sensor to be used for detecting a crank-shaft position.
Figure 25:
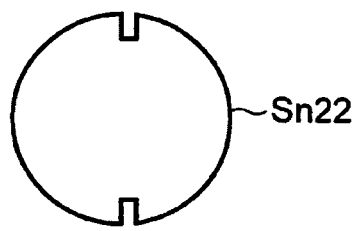
FIG. 25 is a schematic diagram showing a detector of another type.

FIG. 23 is a flow chart showing the control contents of a second embodiment in which the aforementioned timer control is replaced by a detection of the crank-shaft position. The arbitrary constant torque to be set at first Step S26e-1 of this prepositioning control routine need not be necessarily made lower than the torque for the motoring but can be set to a higher value, e.g., 5 Nm than that of the foregoing first embodiment. Moreover, the fluctuating torque negating control of Step S26e-3 of this case can adopt either of the two patterns as in the case of the foregoing first embodiment. Various sensors can be used for deciding the predetermined crank-shaft position at final Step S26e-5. For example, it is possible to use a sensor having a high resolution and capable of detecting a detailed crank-shaft position, or a sensor exemplifying a detector which is prepared by forming corrugations or notches according to the rotation of the crank-shaft on the circumference of a disc-shaped detector Sn21 or Sn22 for rotating synchronously with the crank-shaft, as shown in FIG. 24 or FIG. 25 (in which the corrugations or notches are formed at an interval of 180 degrees according to a four-cylinder engine having two predetermined crank-shaft positions for one rotation of the crank-shaft). Another method can be exemplified by a method for determining the speed signal from the engine by integrating it, or a method for determining the engine speed from the speeds of the generator and the drive motor by using the speed equation (1) of the planetary and by integrating it.

Figure 26:
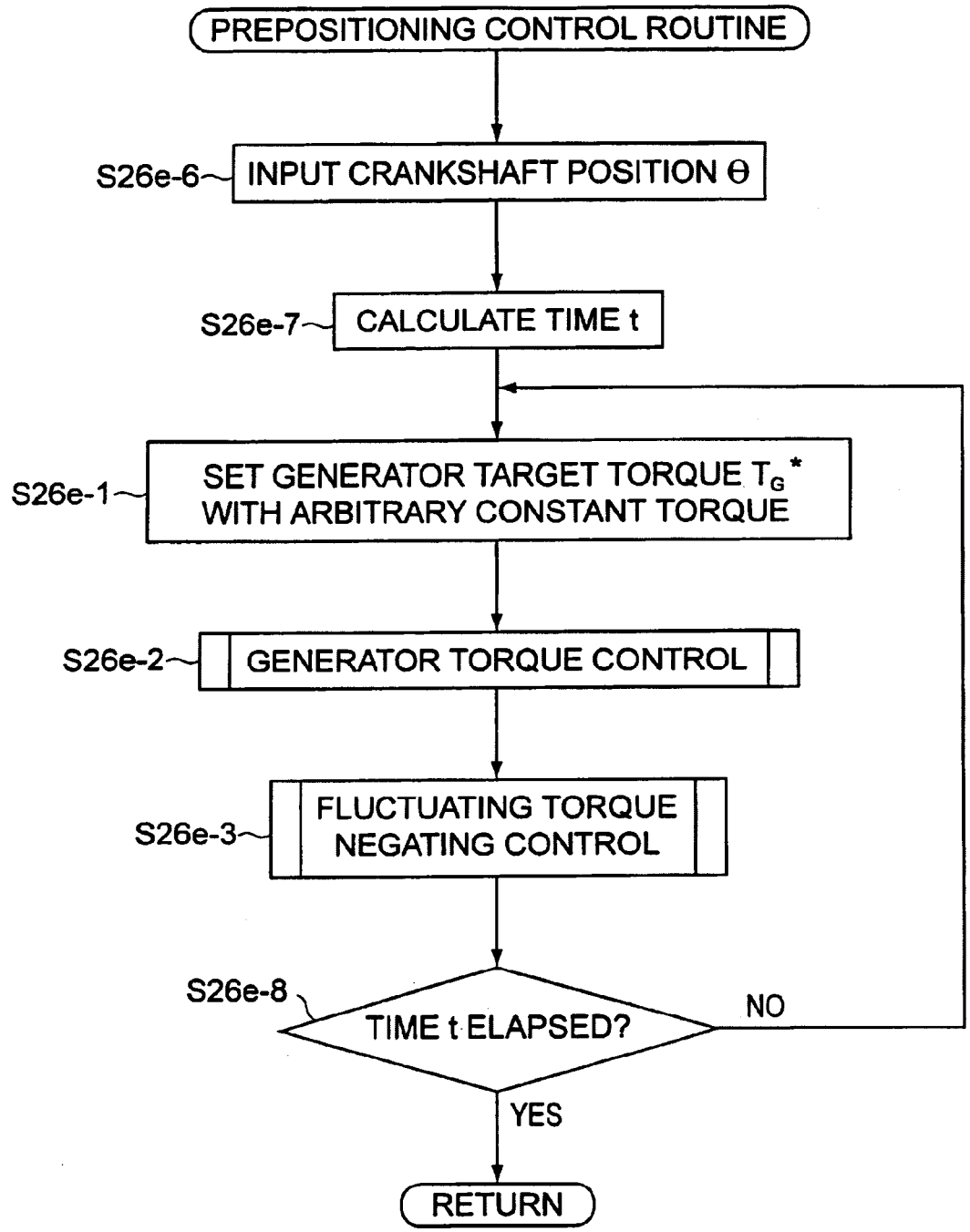
FIG. 26 is a flow chart of a prepositioning control routine of a third embodiment.
Figure 27:
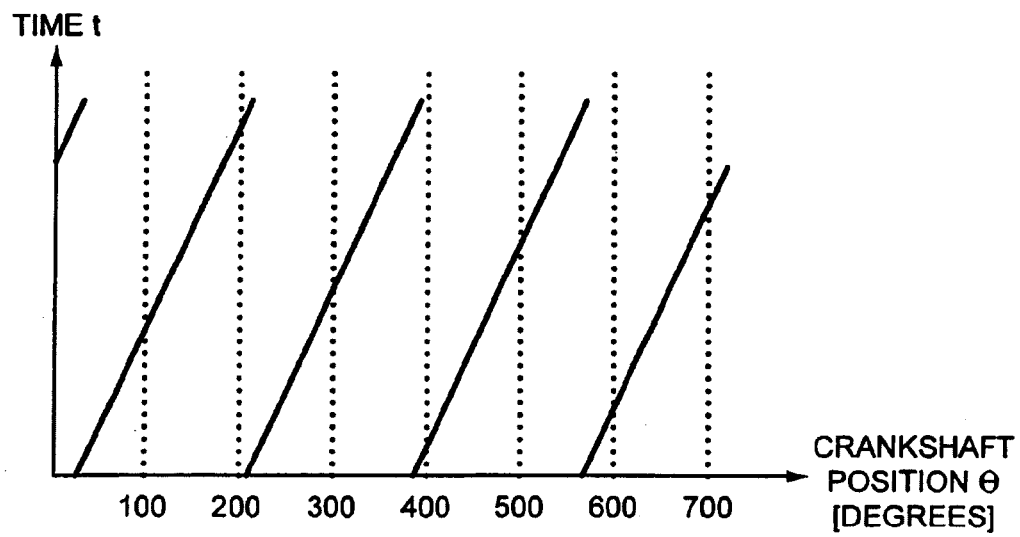
FIG. 27 is a crank-shaft positioning determining map.

Next, FIG. 26 is a flow chart showing the control contents of the prepositioning control of a third embodiment. In this embodiment, premising the use of a sensor having a high resolution and capable of detecting a detailed position, as described hereinbefore, a crank-shaft position ($\theta$) is inputted at first Step S26e-6, and a time (t) till a predetermined crank-shaft position is reached is calculated at next Step S26e-7. The time (t) of this case can be either set in the memory of the vehicle control unit U as a map of the relation of the time (t) to the crank-shaft position ($\theta$ degrees), as shown in FIG. 27, or determined by calculations. The arbitrary torque to be set to the generator target torque of next Step S26e-1 is exemplified by 5 Nm as in the foregoing case of the second embodiment. In this case, the decision of the crank-shaft position is made by deciding the lapse of the time (t) at final Step S26e-8. The remaining Steps are similar to those of the foregoing first and second embodiments.

Figure 28:
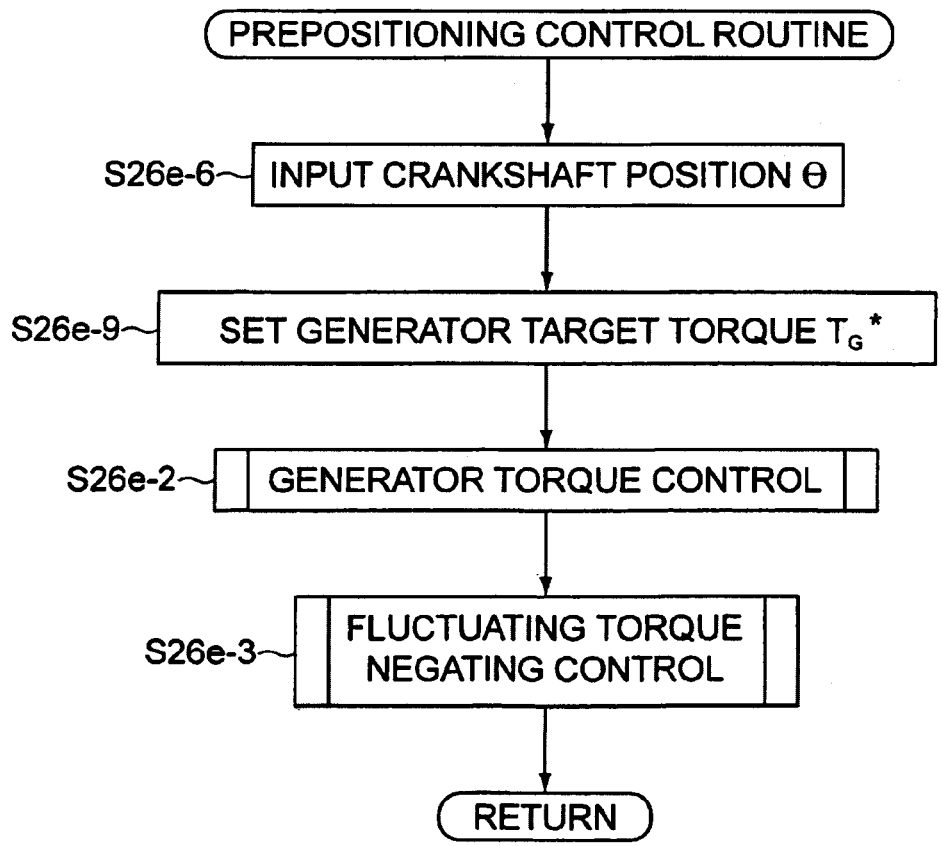
FIG. 28 is a flow chart of a prepositioning control routine of a fourth embodiment.
Figure 29:
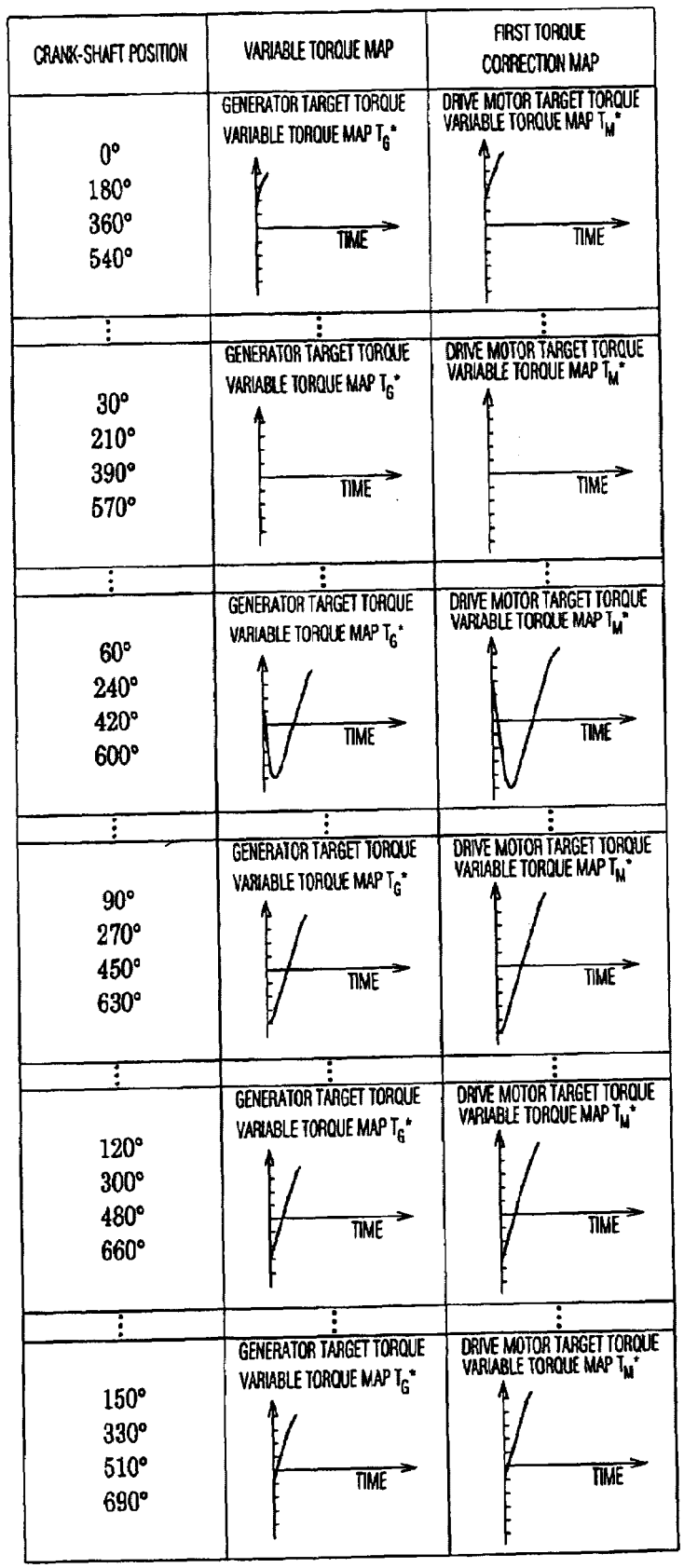
FIG. 29 is a variable torque map and a torque correction map to be used in FIG. 29.

Next, FIG. 28 is a flow chart showing the control contents of the prepositioning control of a fourth embodiment. In this embodiment, unlike the foregoing three embodiments, the torque for setting the crank-shaft position is made variable. In the case of this embodiment, the crank-shaft position ($\theta$) is inputted at first Step S26e-6 as in the preceding third embodiment. At next Step S26e-9, however, the generator target torque ($T_G^*$) is set according to the crank-shaft position. This setting is made by setting the map of the generator target torque ($T_G^*$), as made variable along the cranking torque (as referred to FIG. 18), as shown in FIG. 29, in the memory of the vehicle control unit. The fluctuating torque negating control of this case can be corrected not only according to the aforementioned flow chart of FIG. 20 but also separately by a first torque correcting map, as shown in FIG. 29. This first torque correcting map is one for the drive motor target torque ($T_M^*$) which simply negates the generator target torque ($T_G^*$) by a variable torque map while considering the gear ratio.

Here in the engine start control of the first embodiment, the engine after the prepositioning control is motored by the speed control (as referred to Step S23k of FIG. 17) of the generator. Even at the same generator speed, however, the generator output is different depending upon the temperature. This difference may not be corrected even if the torque negating the fluctuating torque during the motoring is mapped. In order to solve this problem, a complicated control such as a separate temperature correcting control is necessary.

Figure 30:
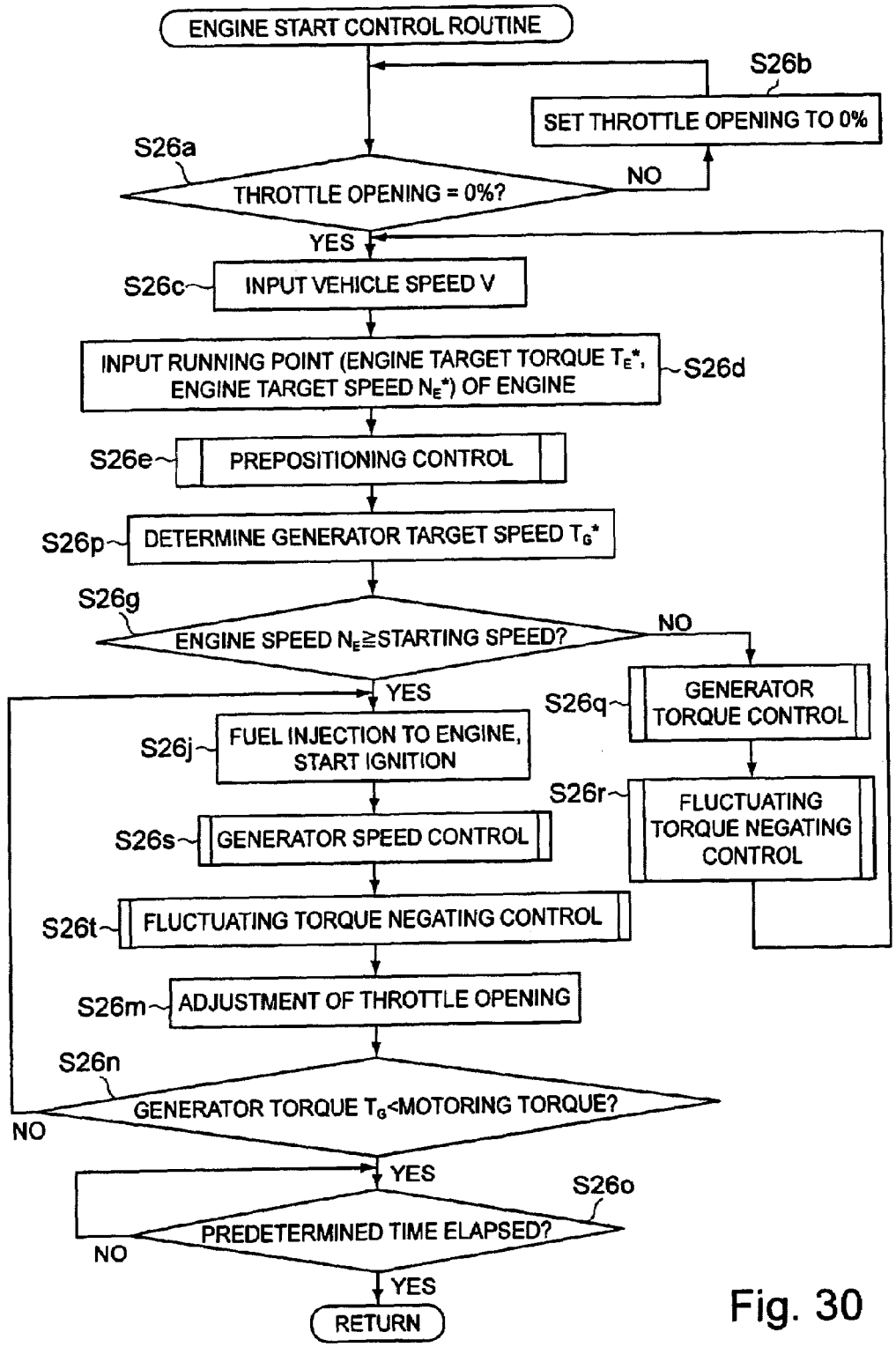
FIG. 30 is a flow chart of an engine start control routine of a fifth embodiment.

In a next fifth embodiment as shown in FIG. 30, therefore, a more precise torque correction is expected in a simple control by motoring in the torque control of the generator and by mapping the corresponding-negating torque. The difference between the engine start control routine shown in FIG. 30 and the engine start control routine shown in FIG. 17 resides essentially in the difference of the torque control from the aforementioned speed control of the generator. By designating the corresponding steps by similar step numbers, therefore, the description will be directed to only the differences but not to the common portions. The contents of the generator torque control of Steps S26q and S26s in this embodiment are similar to those described before with reference to FIG. 12. The fluctuating torque negating controls of Steps S26r and S26t have the following correction patterns, although the foregoing correction method shown in FIG. 21 is the first correction pattern (as will be called the "ordinary correction pattern").

Figure 31:
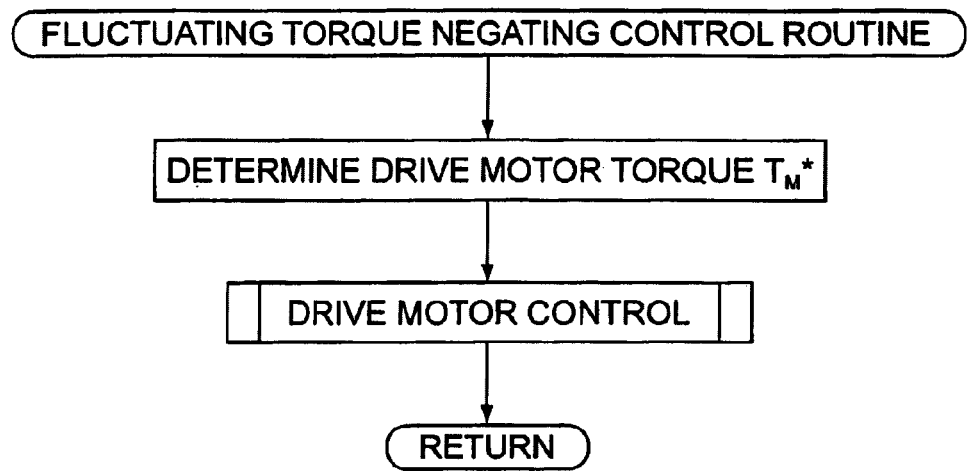
FIG. 31 is a flow chart of a fluctuating torque negating control routine.
Figure 32:
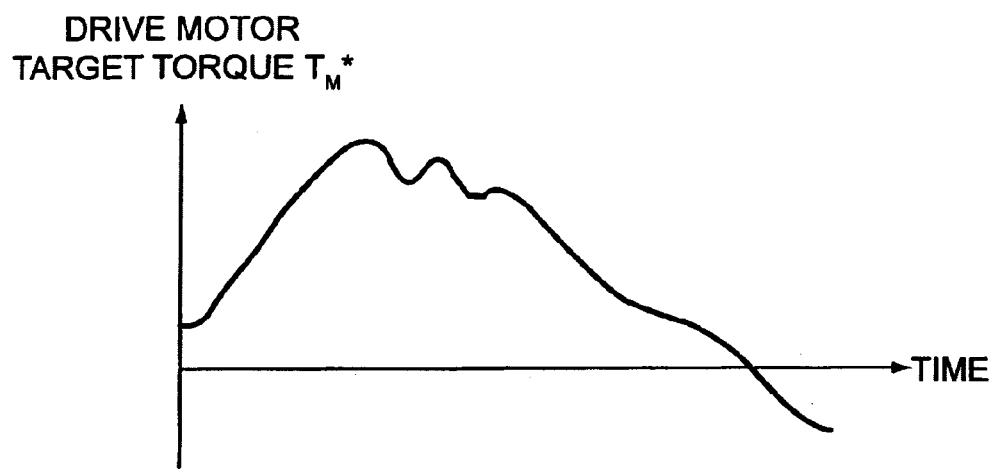
FIG. 32 is a torque map to be used in FIGS. 30 and 31.

A second correction pattern is one according to the generator torque negating map, as shown in FIG. 31. In this pattern, as shown in FIG. 32, the drive motor control is made by determining the generator torque to occur at the motoring time experimentally by the speed control of the generator, by mapping the drive motor target torque ($T_M^*$) to negate the generator torque simply and by setting the drive motor target torque ($T_M^*$).

Figure 33:
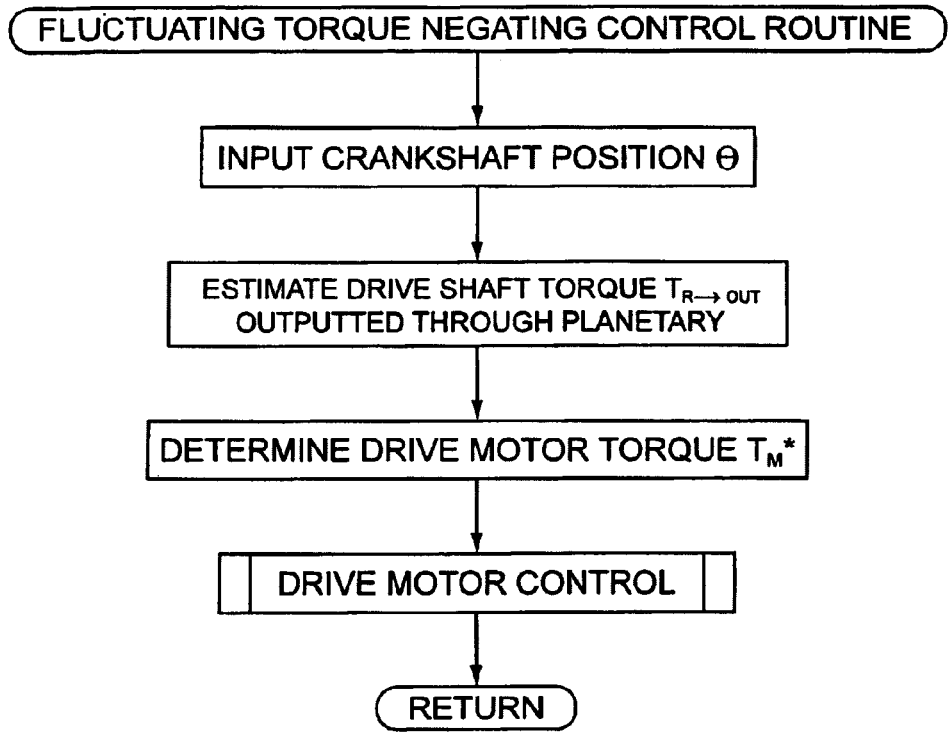
FIG. 33 is a flow chart of another fluctuating torque negating control routine.
Figure 34:
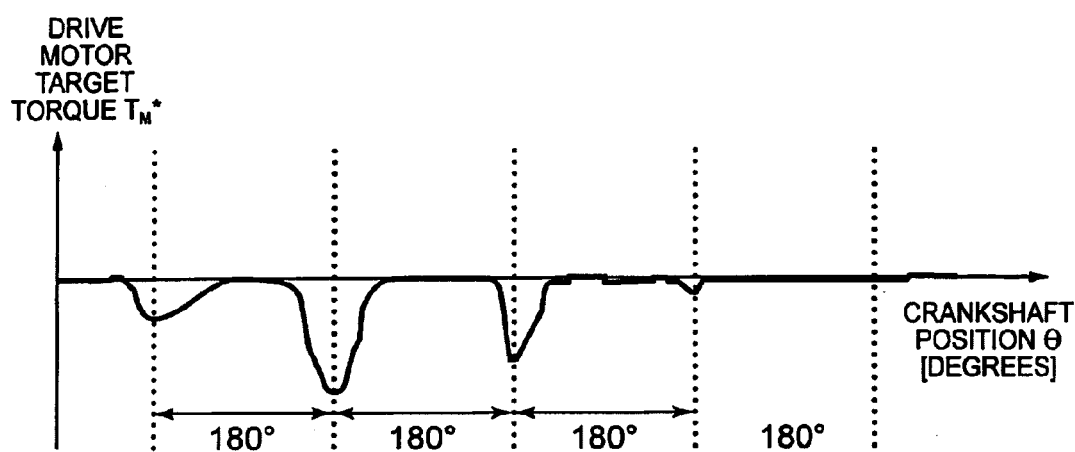
FIG. 34 is a torque map to be used in FIG. 33.
Figure 35:
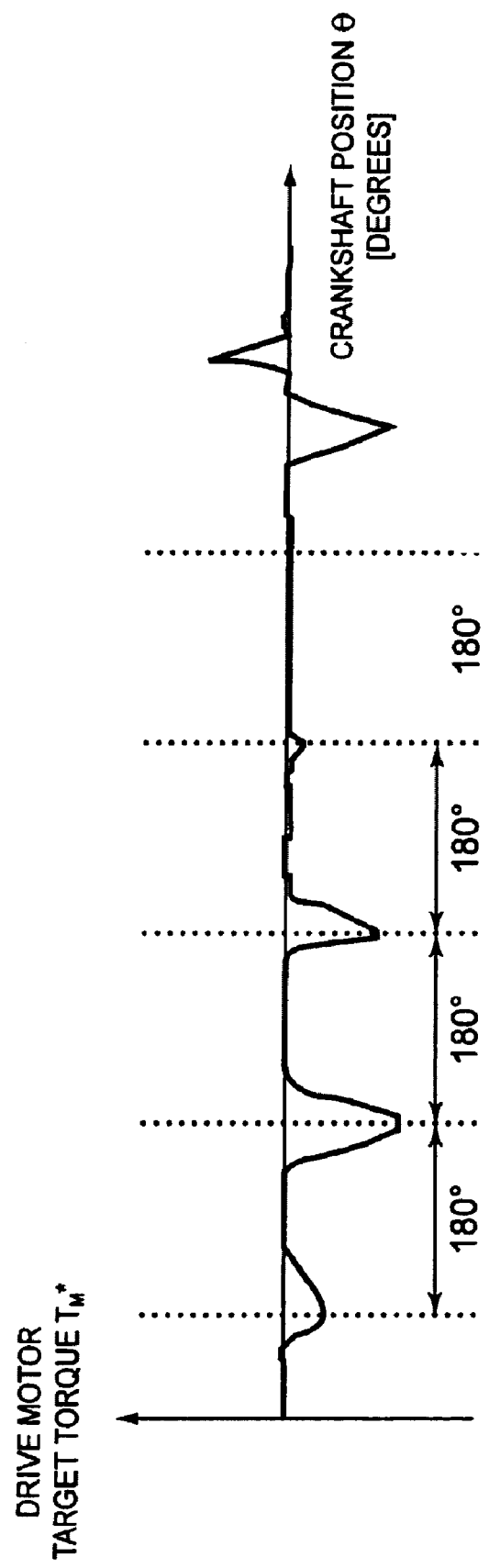
FIG. 35 is another torque map.

A third correction pattern is a correction by the ordinary correction pattern and drive shaft torque fluctuation negating map according to the crank-shaft position, as shown in FIG. 33. Therefore, this correction pattern uses the sensor having a high resolution and capable of detecting a detailed position. For deciding the drive motor target torque ($T_M^*$) in this pattern, there not only is the correction by the ordinary calculation used but also the drive shaft torque negating map shown in FIG. 34 or FIG. 35. In this map, the drive motor target torque ($T_M^*$) is set with respect to the crank-shaft position ($\theta$ degrees), thereby to negate the cranking torque which fluctuates according to the crank angle indicated by the output shaft torque (in a solid curve) in FIG. 19. As shown in FIG. 35, a setting including the torque fluctuation at the engine ignition time is shown, and the fluctuation of the drive shaft torque can be eliminated substantially completely by that correction.

Figure 36:
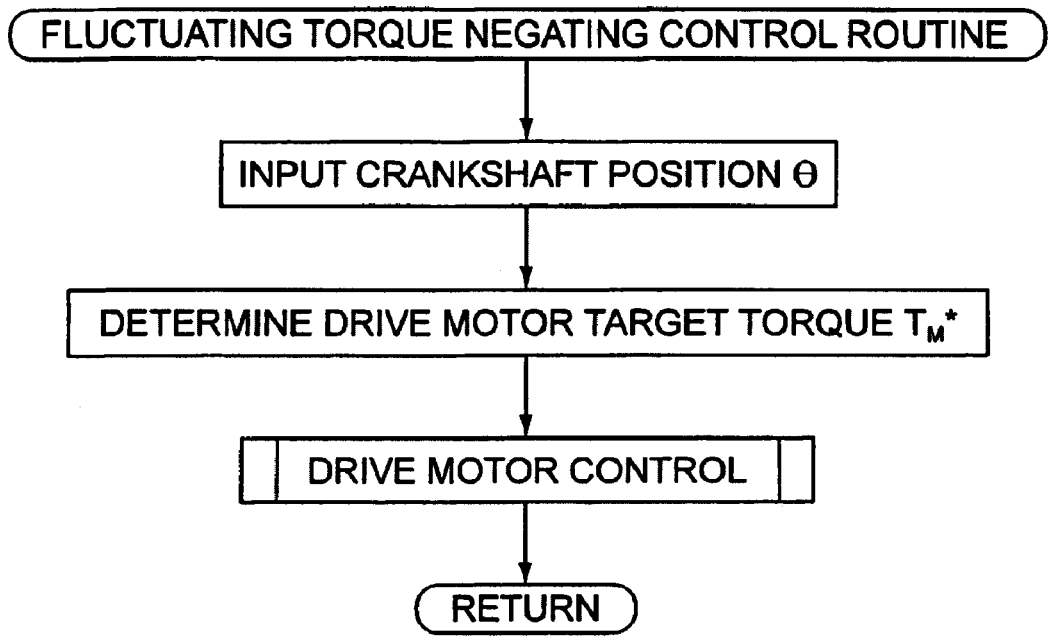
FIG. 36 is a flow chart of still another fluctuating torque negating control routine.
Figure 37:
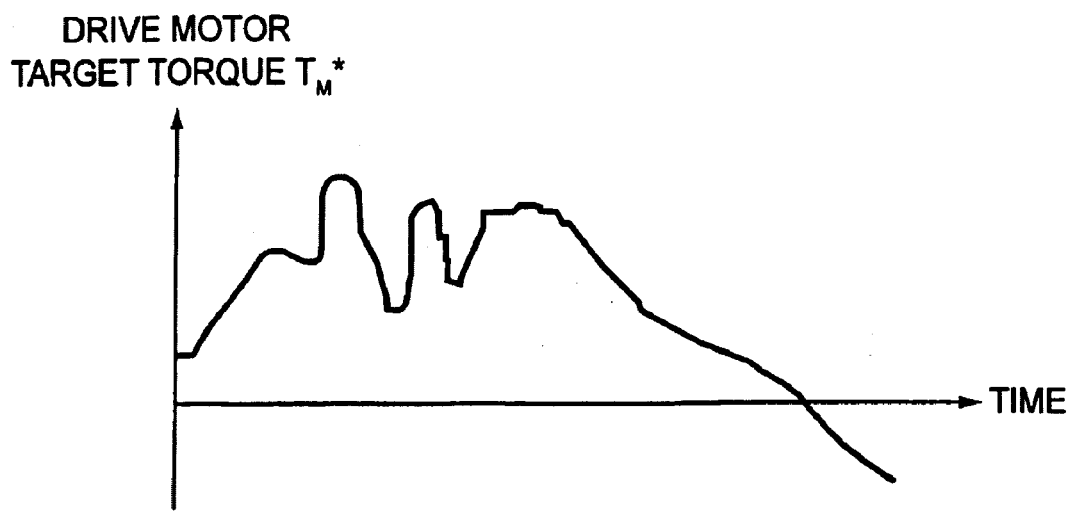
FIG. 37 is a torque map to be used in FIG. 36.

A fourth correction pattern is a combination of the correction by the generator torque negating map and the correction by the drive shaft torque negating map according to the crank-shaft position, as shown in FIG. 36. The drive motor target torque ($T_M^*$) of the torque correction map by this correction, as shown in FIG. 37, is set as a sum of the torque values referring to the map shown in FIG. 32 and the map shown in FIG. 34.

Figure 38:
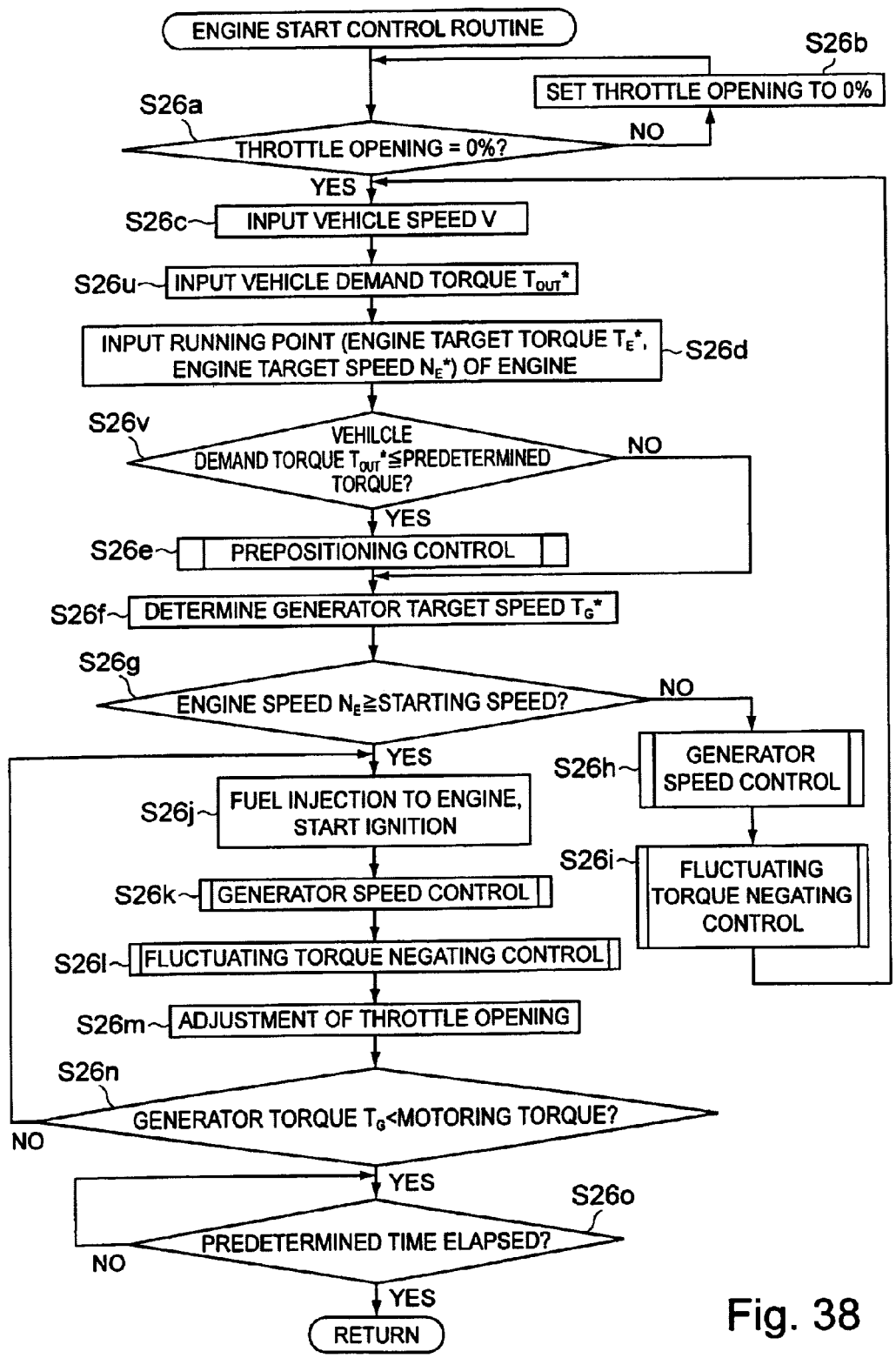
FIG. 38 is a flow chart of an engine start control routine of a sixth embodiment.

Next, the engine start control routine of FIG. 38 shows a sixth embodiment, in which an operation to inhibit the prepositioning control is added when the vehicle demand torque is higher than that of the foregoing engine start control routine shown in FIG. 17. In this control mode, the input of the vehicle demand torque ($T_{OUT}^*$) of Step S26u is added after the input step of the vehicle speed (V), and the decision of Step S26v on the vehicle demand torque ($T_{OUT}^*$) is less than or equal to a predetermined torque is added after the input of the running points of the engine. If this decision does not hold, the prepositioning control is skipped. The remaining flow chart is similar to that of the engine start control routine of the first embodiment shown in FIG. 17, the description will be omitted by designating the corresponding steps by similar step numbers.

Figure 39:
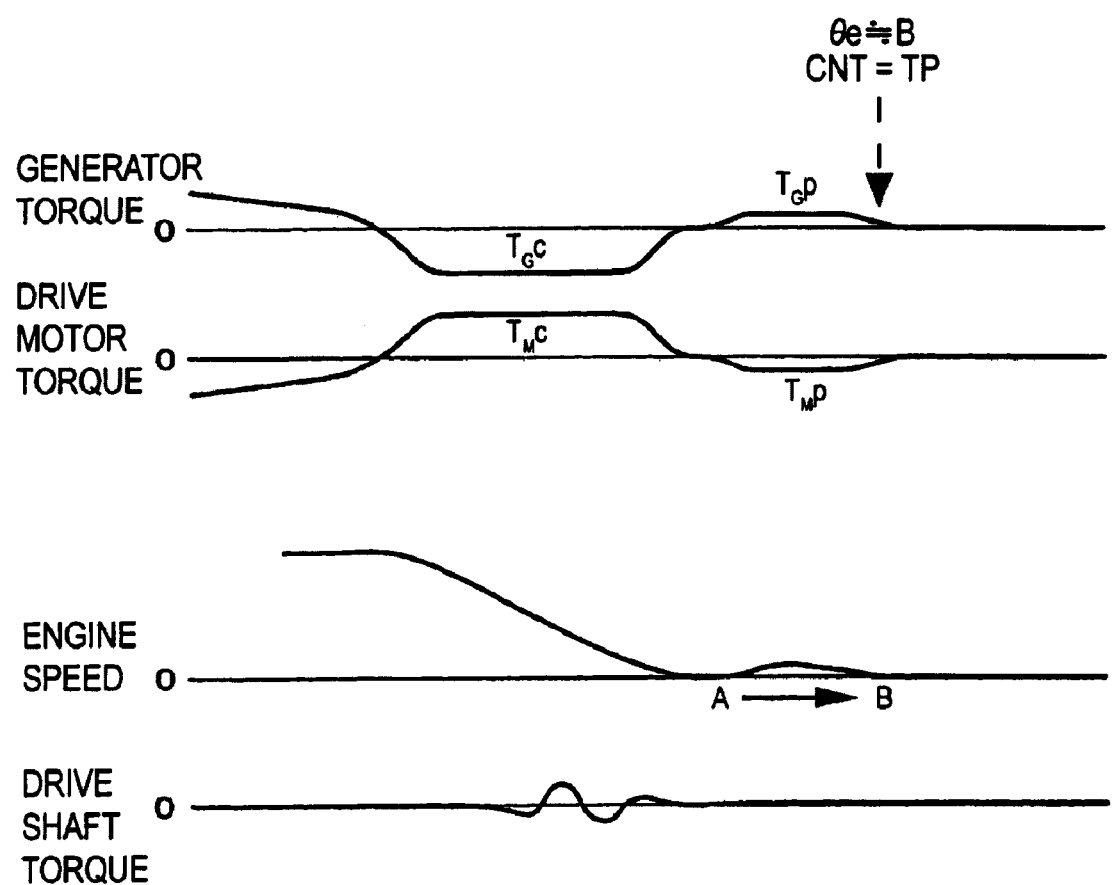
FIG. 39 is a time chart of a prepositioning control in an engine stop control of a seventh embodiment.

In the foregoing individual embodiments, the prepositioning control has been made as a pretreatment for the engine start but may also be made as an after-treatment at the engine stopping time. Next, FIG. 39 is a time chart showing a seventh embodiment for this treatment. In this embodiment, the engine being run in the fuel cut state is controlled to be stopped quickly by causing the generator to absorb the torque. In this case, too, the drive motor is caused to output the correction torque to reduce the generator torque to 0 on the output shaft. As a result, the engine is abruptly decelerated from the idling run so that the fluctuation of the output shaft torque is caused at a speed just before the stop by the torque fluctuation. However, this fluctuation continues from the running state so that it is as low as the torque fluctuation at the beginning of the cranking of the preceding first embodiment. When the engine speed thus comes substantially to 0, the engine position adjusting torque ($T_G$ p) is outputted in the discontinuous run to move the engine position from the A position to the B position. In this case, too, a correction is made to reduce the generator torque to 0 on the output shaft by adjusting the drive motor torque output ($T_M$p). Depending on the subsequent running state, the torque in the reverse direction to the A position may act on the crank-shaft of the engine which has thus stopped at the B position. However, the reverse run of the engine 1 is blocked by the engagement of the one-way clutch 8 and can be held at that position. In this embodiment, therefore, an excessive power consumption can be prevented, because the torque need not be continuously applied by the generator 2 so as to hold the engine 1 at the cranking position.

Figure 40:
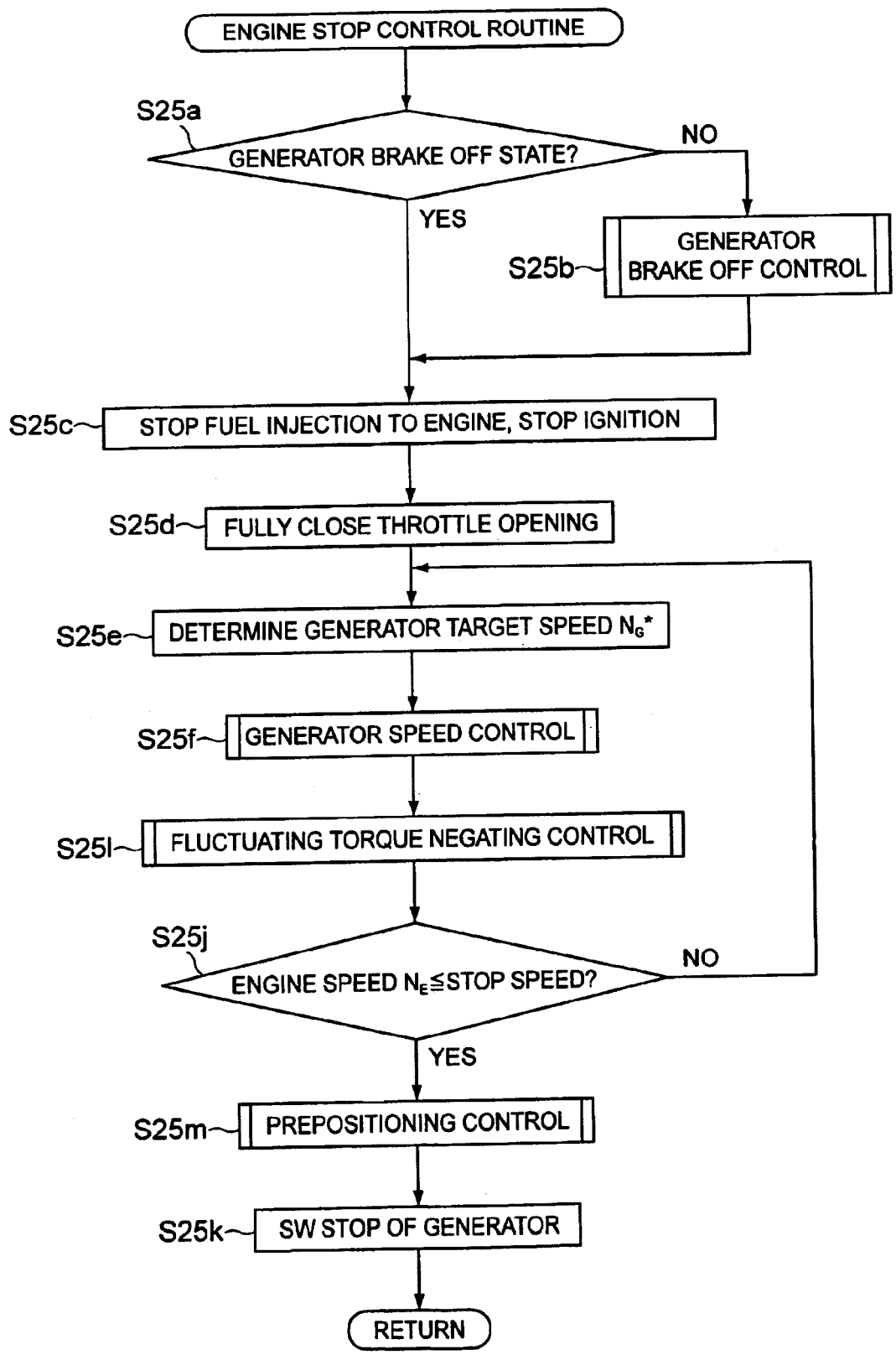
FIG. 40 is a flow chart of the engine start control routine.

FIG. 40 is a flow chart showing the control contents described above. In the engine stop control routine of this case, the engine stop control routine of Step S25 in the first embodiment is partially replaced by a prepositioning control. Specifically, Steps S25g to S25i of the portions relating to the drive motor control are replaced by the fluctuating torque negating control of Step S25l, and a prepositioning control step of Step S25m is added before the final Step S25k. The torque correction pattern in the fluctuating torque negating control of this case can be exemplified by an ordinary correction pattern as in the case of the first embodiment. Moreover, the torque correction pattern in the prepositioning control can also be exemplified by an ordinary correction pattern as in the first embodiment. In addition, there can be conceived as at the start control time the various patterns, the description of which will be omitted because they are basically similar to those of the method for executing the correction before the engine start.

According to this control mode, the crank-shaft position control prior to the engine start is not required so that a quick response for starting the cranking of the engine directly at an arbitrary timing can be made even in case the drive demand of the driver changes just after the engine stop. Moreover, the torque vibrations in this case can be reduced like the case of the first embodiment by the crank-shaft position control made in advance at the engine stop time.

Figure 41:
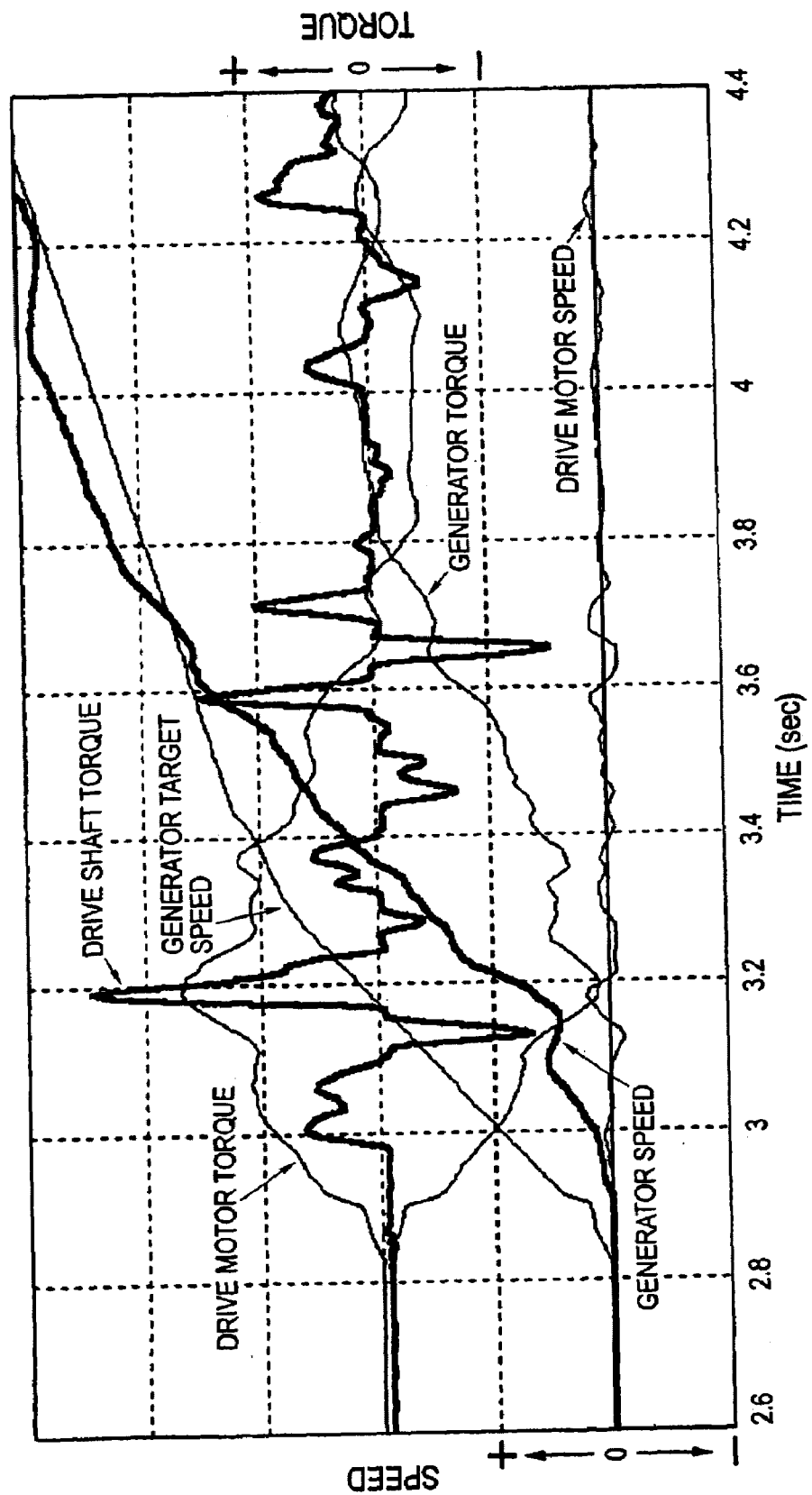
FIG. 41 is a time chart of an engine start of the related art.
Figure 42:
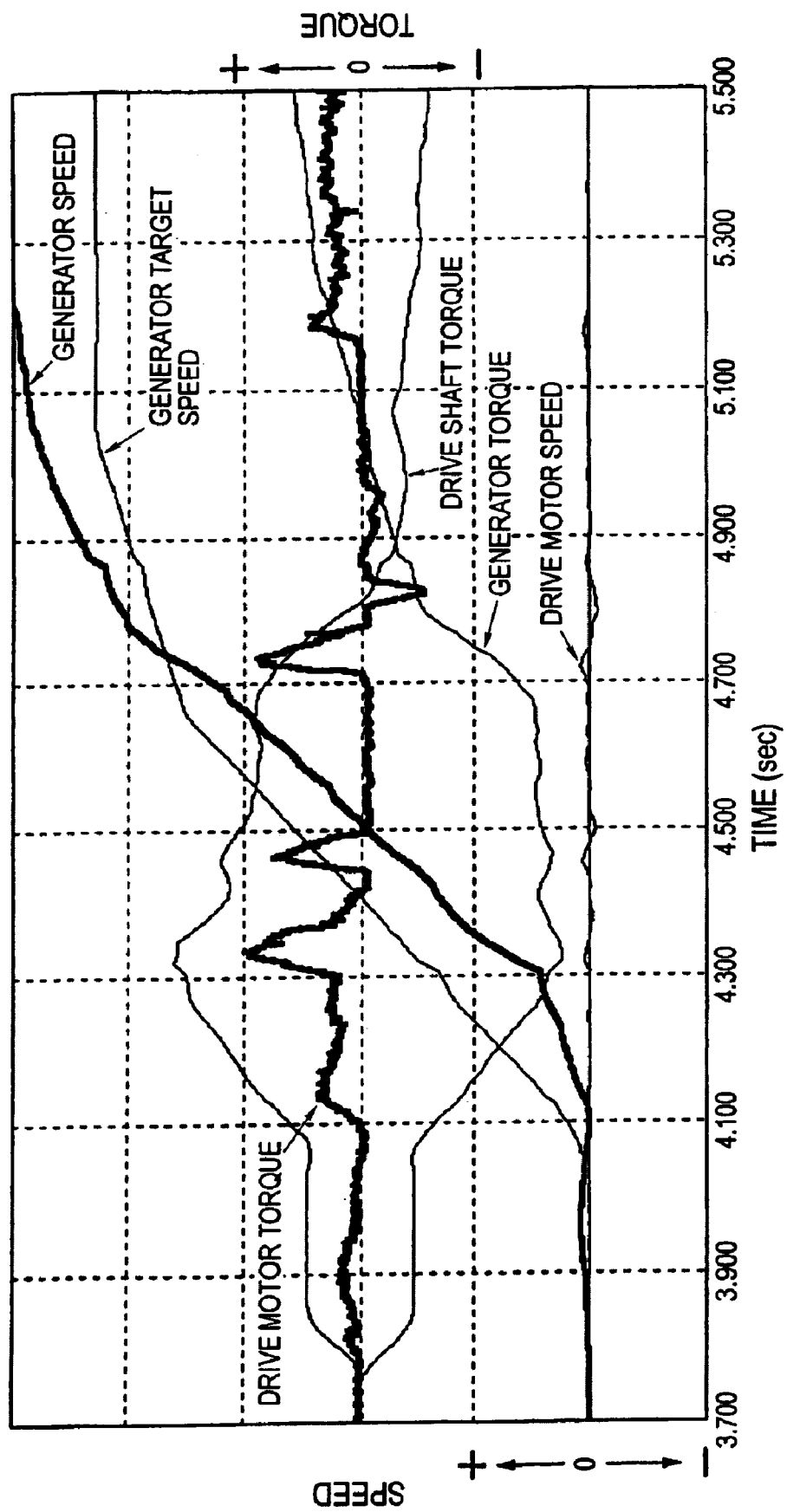
FIG. 42 is a time chart of a prepositioning control at an engine starting time according to the invention.
Figure 43:
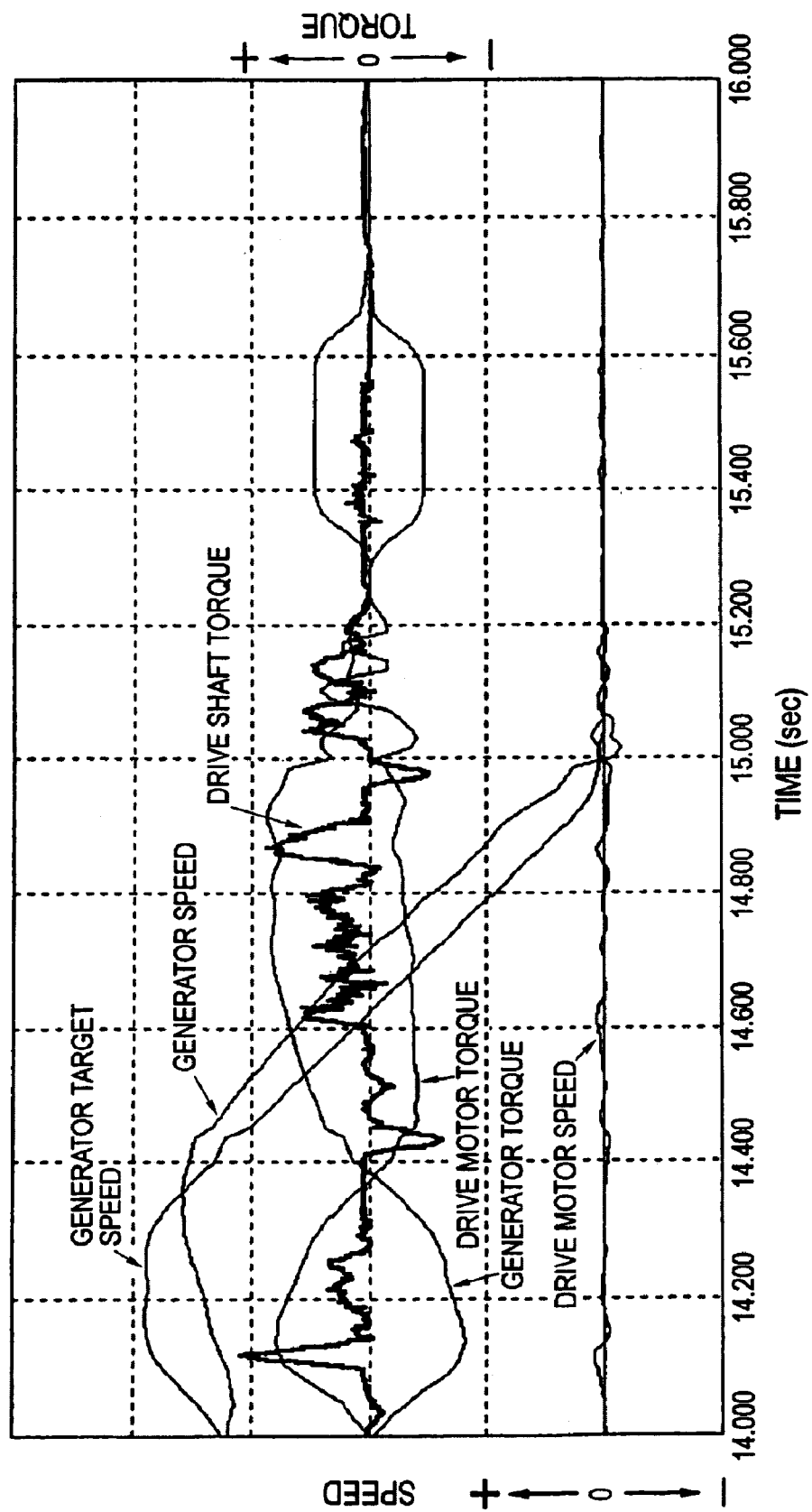
FIG. 43 is a time chart of a prepositioning control at an engine stopping time according to the invention.

Finally, FIG. 41 to FIG. 43 are time charts showing the actual measurements comparing the engine start of the prior art and the engine start control accompanied by the prepositioning control according to the invention, so as to verify the effects of the prepositioning control according to the invention. All these time charts illustrate the data in the vehicle stop state with a view to preventing the complicated waveforms to facilitate the references. In the engine start without the prepositioning control, as shown in FIG. 41, the motoring by the generator abruptly starts (as referred to the changes in the generator torque and the generator speed from 2.8 secs.) so that the crank-shaft vigorously rotates till the compression stroke end (as likewise referred to the torque peak of 3.2 secs.) of the highest load. After this, the motoring gradually proceeds so that the rotation of the generator is caused to drop at an instant (as referred to the position of 3.1 secs.) by the bounce from the damper. As a result, the difference between the generator target speed and the actual generator speed grows so large as to establish a state in which the actual generator speed follows the target value. As a result, the generator speed abruptly rises. It is found that the rise causes a high torque fluctuation on the drive shaft (as referred to the rising gradient of the drive shaft torque of 3.1 secs. to 3.2 secs.). After this, the torque is irregularly disturbed to fluctuate without converging for a long time.

According to the prepositioning control at the engine starting time, as shown in FIG. 42, according to the invention, on the other hand, it is found that the crank-shaft position control starts near 3.7 secs. (as referred to the change in the generator torque) and ends near 4.1 secs., and that the cranking is started from that position so that the fall of the generator speed is suppressed to a remarkably small value in the vicinity of 4.3 secs. As a result, the torque fluctuation to occur in the drive shaft torque is effectively reduced. Moreover, no subsequent disturbance occurs in the torque fluctuation of the drive shaft.

According to the prepositioning control at the engine stop time, as shown in FIG. 43, according to the invention, it is found that the crank-shaft position control to start near 15.3 secs. is substantially small with respect to the occurrence of the drive shaft torque fluctuation by the preceding engine stopping operation.

Although the present invention has been described in detail in connection with the various embodiments, it should not be limited to the embodiments but could be practiced in various specific manners within the scope of the claims. For example, the second embodiment, in which the prepositioning control is made at the engine stop time, could be constructed such that the prepositioning control is made at a suitable timing after the engine stop. The timing of this case is proper for the engine position control without giving any physical disorder to the driver, if it is made to the instant when the drive torque change is controlled for the accelerator manipulation or brake manipulation for the driver to change the drive demand. Moreover, the application of the invention has been described by enumerating the hybrid drive apparatus using the engine and the electric motor as its power source. However, the application of the present invention should not be limited thereto but could be employed a system for stopping/starting the engine automatically so as to prevent the unnecessary idling when the vehicle stops.

The invention claimed is:

1. A drive apparatus, comprising:
  a first electric motor that raises an engine to a speed for an ignition; and
  a control unit for controlling the engine and the first electric motor, wherein the control unit performs prepositioning control for controlling the first electric motor with a torque output so that the engine is positioned at a predetermined crank-shaft position when stopped and causes the first electric motor to output a torque short of a torque necessary for running the engine continuously.

2. The drive unit as set forth in claim 1, wherein the control unit causes the first electric motor to output an arbitrary constant torque.

3. The drive unit as set forth in claim 2, wherein the control unit causes the constant torque to be outputted only for a predetermined time.

4. The drive unit as set forth in claim 3, comprising:
  first crank-shaft position detecting means for detecting the crank-shaft position, wherein the control unit makes the predetermined time variable according to a difference between a present crank-shaft position and the predetermined crank-shaft position.

5. The drive unit as set forth in claim 1, comprising:
  second crank-shaft position detecting means for detecting the predetermined crank-shaft position, wherein the control unit causes the first electric motor to output a torque until a crank-shaft is positioned at the predetermined crank-shaft position.

6. The drive unit as set forth in claim 5, wherein the control unit causes the first electric motor to output a variable torque.

7. The drive unit as set forth in claim 6, further comprising:
first crank-shaft position detecting means for detecting a crank-shaft position, wherein the control unit causes the variable torque to be outputted according to a difference between a present crank-shaft position and the predetermined crank-shaft position.

8. The drive unit as set forth in claim 7, wherein the control unit has a variable torque map predetermined according to the difference between the present crank-shaft position and the predetermined crank-shaft position.

9. The drive unit as set forth in claim 7, wherein the variable torque is a torque along the cranking torque of the engine.

10. The drive unit as set forth in claim 1, wherein the predetermined crank-shaft position is at a highest cranking torque position for the engine.

11. The drive unit as set forth in claim 1, comprising:
a second electric motor, wherein the engine, the first electric motor and the second electric motor are mechanically connected to a wheel and the control unit controls the second electric motor so as to absorb a fluctuation in the torque to be outputted to the wheel during the prepositioning control.

12. The drive unit as set forth in claim 11, wherein the control unit calculates the fluctuation of a torque to be outputted to the wheel from a torque outputted by the first electric motor.

13. The drive unit as set forth in claim 11, wherein the control unit controls the second electric motor on the basis of a first torque correction map predetermined according to the prepositioning control.

14. The drive unit as set forth in claim 13, wherein the control unit causes the first electric motor and the second electric motor to output torques simultaneously.

15. The drive unit as set forth in claim 1, wherein the control unit executes the prepositioning control prior to the raising of the engine to the speed for the ignition.

16. The drive unit as set forth in claim 15, wherein the control unit controls a speed of the first electric motor at a time when the engine is raised to the ignition speed for the ignition.

17. The drive unit as set forth in claim 15, wherein the control unit controls a torque of the first electric motor at the time when the engine is raised to the speed for the ignition.

18. The drive unit as set forth in claim 17, wherein the control unit controls the torque of the first electric motor on the basis of a predetermined map.

19. The drive unit as set forth in claim 15, wherein the control unit controls the second electric motor so as to absorb a torque fluctuation to be outputted to a wheel at the time when the engine is raised to the speed for the ignition.

20. The drive unit as set forth in claim 19, wherein the control unit calculates the fluctuation of a torque to be outputted to the wheel from a torque outputted by the first electric motor.

21. The drive unit as set forth in claim 19, wherein the control unit controls the second electric motor on the basis of a second correction map predetermined according to the raising of the speed of the engine for the ignition.

22. The drive unit as set forth in claim 19, wherein the control unit further controls the second electric motor on the basis of a third torque correction map predetermined according to a crank-shaft position of the engine.

23. The drive unit as set forth in claim 21, wherein the control unit causes the first electric motor and the second electric motor to output torques simultaneously.

24. The drive unit as set forth in claim 15, wherein the control unit makes the prepositioning control if the drive demand of a driver is no more than a predetermined value.

25. The drive unit as set forth in claim 1, wherein the control unit executes the prepositioning control subsequent to the engine being stopped which is caused by lowering an engine speed forcibly by a generator after a fuel cut.

26. The drive unit as set forth in claim 25, wherein the control unit controls the second electric motor so as to absorb a fluctuation of the torque to be outputted to a wheel while the engine speed is forcibly lowered.

27. The drive unit as set forth in claim 1, further comprising:
a one-way clutch for blocking a reverse running of the engine.

28. The drive unit as set forth in claim 1,
wherein the control unit controls the first electric motor so that a cranking torque during motoring may be a predetermined torque short of a torque necessary for running the engine continuously.

* * * * *